US007092615B2

(12) United States Patent
Tanikawa et al.

(10) Patent No.: US 7,092,615 B2
(45) Date of Patent: Aug. 15, 2006

(54) CONTENT REPRODUCING APPARATUS FOR REPRODUCING CONTENT THAT IS STREAM DATA DIVIDED INTO A PLURALITY OF REPLY SEGMENTS, AND CONTENT TRANSMITTING/RECEIVING SYSTEM

(75) Inventors: Kentaro Tanikawa, Kadoma (JP); Toshihiko Munetsugu, Katano (JP); Yoshiaki Iwata, Moriguchi (JP); Kazuhiro Nishitani, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 102 days.

(21) Appl. No.: 10/408,229

(22) Filed: Apr. 8, 2003

(65) Prior Publication Data

US 2003/0228130 A1 Dec. 11, 2003

(30) Foreign Application Priority Data

Jun. 5, 2002 (JP) ............................. 2002-164853
Jun. 5, 2002 (JP) ............................. 2002-164854
Jun. 5, 2002 (JP) ............................. 2002-164855

(51) Int. Cl.
*H04N 5/91* (2006.01)
(52) U.S. Cl. ........................................ 386/69; 386/70
(58) Field of Classification Search .................... 386/1, 386/6–7, 46, 68–70, 81–82; 358/908; 725/22; H04N 5/76, 5/783, 9/79
See application file for complete search history.

(56) References Cited

U.S. PATENT DOCUMENTS

| 5,172,111 | A | * | 12/1992 | Olivo, Jr. ..................... 386/126 |
| 5,613,109 | A | | 3/1997 | Yamauchi et al. |
| 6,304,715 | B1 | * | 10/2001 | Abecassis ..................... 386/68 |
| 6,519,770 | B1 | * | 2/2003 | Ford ............................ 725/28 |
| 2001/0033739 | A1 | * | 10/2001 | Oguro et al. .................. 386/94 |
| 2003/0158979 | A1 | * | 8/2003 | Tateyama et al. ............. 710/33 |

FOREIGN PATENT DOCUMENTS

JP 10-164550 6/1998

* cited by examiner

*Primary Examiner*—Thai Tran
*Assistant Examiner*—Heather R. Jones
(74) *Attorney, Agent, or Firm*—Wenderoth, Lind & Ponack, L.L.P.

(57) ABSTRACT

A content reproducing apparatus according to the present invention is such that the content reproducing apparatus judges whether or not reproducing data of a replay segment pointed out by the skip instruction is skippable when a skip instruction from a user is accepted while a content is being reproduced. When a result of judgment is negative to the skip instruction, an alternative data is reproduced in place of data of the replay segment hat has been instructed to be skipped. When the reproducing of the alternative data is completed, so that data of the replay segment successive to the replay segment pointed out by the skip instruction is executed.

26 Claims, 20 Drawing Sheets

FIG.3

| ID | REPRODUCING POSITION INFORMATION | | SKIP ATTRIBUTE | ALTERNATIVE DATA ID |
|---|---|---|---|---|
| | STARTING POSITION | ENDING POSITION | | |
| SCENE A | 0 | 20 | ○ | — |
| CM1 | 20 | 30 | × | CM4 |
| SCENE B | 30 | 50 | ○ | — |
| SCENE C | 50 | 80 | ○ | — |
| CM2 | 80 | 90 | × | CM5 |
| SCENE D | 90 | 110 | ○ | — |
| CM3 | 110 | 120 | × | — |
| SCENE E | 120 | 140 | ○ | — |

| DATA ID | REPRODUCING POSITION INFORMATION | | SKIP ATTRIBUTE | ALTERNATIVE DATA ID | | | |
|---|---|---|---|---|---|---|---|
| | STARTING POSITION | ENDING POSITION | | CATEGORY 602 | CATEGORY 603 | CATEGORY 604 | |
| SCENE A | 0 | 20 | ○ | — | — | — | |
| CM1 | 20 | 30 | × | CM4 | CM5 | CM6 | |
| SCENE B | 30 | 50 | ○ | — | — | — | |
| SCENE C | 50 | 80 | ○ | — | — | — | |
| CM2 | 80 | 90 | × | CM7 | CM8 | CM9 | |
| SCENE D | 90 | 110 | ○ | — | — | — | |
| CM3 | 110 | 120 | × | — | — | — | |
| SCENE E | 120 | 140 | ○ | — | — | — | |

| SKIPPED ALTERNATIVE DATA ID | TARGET ALTERNATIVE DATA ID |
|---|---|
| CM4 | CM5 |
| CM5 | CM6 |
| CM6 | CM4 |
| CM7 | CM8 |
| CM8 | CM9 |
| CM9 | CM7 |

| ORDER | ALTERNATIVE DATA ID |
|---|---|
| 1 | CM4 |
| 2 | CM5 |
| 3 | CM6 |
| 4 | CM7 |
| 5 | CM8 |
| 6 | CM9 |

| ID | REPRODUCING POSITION INFORMATION 1301 | | CM ATTRIBUTE |
| --- | --- | --- | --- |
| | STARTING POSITION | ENDING POSITION | |
| SCENE A | 0 | 20 | — |
| CM1 | 20 | 30 | ○ |
| CM2 | 30 | 40 | ○ |
| CM3 | 40 | 50 | ○ |
| SCENE B | 50 | 80 | — |
| CM4 | 80 | 90 | ○ |
| CM5 | 90 | 100 | ○ |
| CM6 | 100 | 110 | ○ |
| SCENE C | 110 | 140 | — |
| CM7 | 140 | 150 | ○ |
| CM8 | 150 | 160 | ○ |
| CM9 | 160 | 170 | ○ |
| SCENE D | 170 | 180 | — |

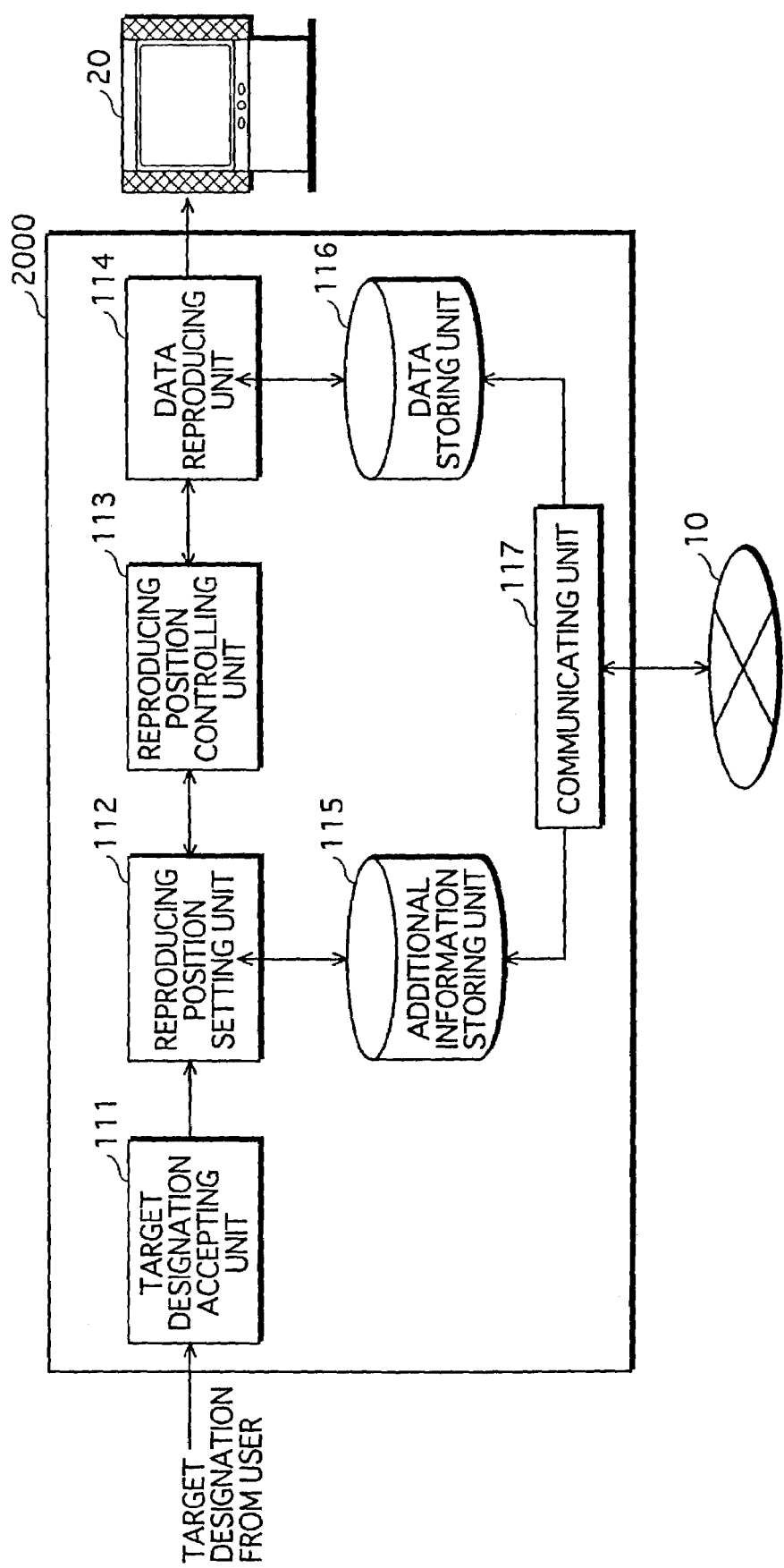

CONTENT REPRODUCING APPARATUS FOR REPRODUCING CONTENT THAT IS STREAM DATA DIVIDED INTO A PLURALITY OF REPLY SEGMENTS, AND CONTENT TRANSMITTING/RECEIVING SYSTEM

BACKGROUND OF THE INVENTION (1) Field of the Invention

The present invention relates to a technique of controlling reproduction of a content which is stream data divided into a plurality of replay segments, and more specifically, it relates to the skip function thereof.

(2) Description of the Prior Art

In recent years, services for distributing users with multimedia contents (hereinafter referred to as contents) that include commercial messages (CM) of sponsors of the contents at no extra charge have been offered. A user can listen and watch a distributed content using a content reproducing apparatus, such as a personal computer and a mobile device. The distributed content is divided into a plurality of replay segments, and each of the plurality of replay segment includes a part of the content with a certain degree of cohesiveness, such as each scene from the main content.

A content reproducing apparatus is provided with a skip function as one of functions related to content reproduction. When the content reproducing apparatus receives a skip instruction from a user during a content is being reproduced, the content reproducing apparatus stops reproducing data of a replay segment that is being reproduced and starts reproducing data of a succeeding replay segment. Further, when the content reproducing apparatus receives an instruction from the user that specifies the replay segment to be reproduced after skipping, the content reproducing apparatus starts reproducing data of the specified replay segment. Utilizing the skip function enables a user to listen and watch the contents effectively in a short period of time, without reproducing content that the user does not wish to listen nor watch.

On the other hand, the skip function can be disadvantageous for content providers, because it is possible that, by utilizing the skip function, users listen and watch contents without reproducing replay segments for CMs of sponsors. If a CM is skipped without being reproduced too often, it becomes highly probable that the sponsor considers the advertising effectiveness of the CM is low and thus stops sponsoring. A method disclosed in Japanese Laid-Open Patent Application No. H10-164550 provides one solution to the above problem. H10-164550 teaches a mechanism in which a key for decoding an encrypted main content is embedded in data of a CM and the key can be obtained only by reproducing the entire data of the CM.

However, the method disclosed in H10-164550 forces a user to reproduce the CM in order to listen and watch the main content, even if the user is not interested in the CM included in the content at all. Users will not be amused by such forced CMs, and sponsors also try to avoid a sense of discomfort being caused in the users while listening and watching their CMs as much as possible.

Moreover, in a case in which the method taught in H10-164550 is applied to a content distribution service that distributes dynamically arranged content, a content distributing server executes an encrypting process to the arranged content. Because the encrypting process is required to be executed in real time, such a method increases the load to the content distributing server.

SUMMARY OF THE INVENTION

An object of the present invention is to provide content reproducing apparatuses, content transmitting/receiving systems, and various technologies relating to the same. More specifically, the present invention provides such apparatuses, systems, and technologies that can be applied without putting heavy load on content distributing servers, and that can reproduce the data intended by content providers while tolerating skipping the data as much as possible when an instruction from a user to skip reproducing of data of a certain replay segment such as CMs is received.

In order to achieve the above object, a content reproducing apparatus according to the present invention is a content reproducing apparatus comprising: a reproducing unit operable to reproduce a content, the content being stream data divided into a plurality of replay segments; an obtaining unit operable to obtain an alternative data; an accepting unit operable to accept an instruction from a user while the content is being reproduced; and a controlling unit operable to control so that, if the instruction is a skip instruction that instructs skipping reproduction of data of a first replay segment, the alternative data is reproduced in place of the data of the first replay segment with or without a condition, and data of a second replay segment is reproduced when the reproducing of the alternative data is completed, the first replay segment being one of the plurality of replay segments in the content, the second replay segment being located after the first replay segment on a reproducing time-line of the content.

By the above apparatus, it is possible to reproduce the data intended by content providers without fail while tolerating skipping the data as much as possible when a user instruction to skip reproducing the data of a certain replay segment such as the CMs is accepted.

A content reproducing apparatus according to the present invention can also be a content reproducing apparatus further comprising: a judging unit operable to judge whether or not reproduction of the data of the first replay segment is skippable by referring to additional information, if the instruction from the user accepted by the accepting unit is the skip instruction, the additional information indicating if reproduction of data of each of the plurality of replay segments in the content is skippable, wherein the obtaining unit obtains the additional information, and the controlling unit controls so that, only when a judgment result in the judging unit is negative, the alternative data is reproduced in place of the data of the first replay segment, and the data of the second replay segment is reproduced when the reproducing of the alternative data is completed.

By the above apparatus, it is possible to judge based on additional information of the content whether reproduction of the data of the replay segment pointed out by the skip instruction is skippable.

A content reproducing apparatus according to the present invention can also be a content reproducing apparatus, wherein the obtaining unit obtains a plurality of alternative data, and the controlling unit controls so that, if the instruction from the user accepted by the accepting unit is the skip instruction, an entire part of at least one of the plurality of alternative data is reproduced in place of the data of the first replay segment, and the data of the second replay segment is reproduced when the reproducing of the alternative data is completed.

By the above apparatus, at least of the alternative data is reproduced. By setting CM data as the alternative data, for example, it is possible to reproduce the CM data without fail.

A content reproducing apparatus according to the present invention can also be a content reproducing apparatus, wherein the controlling unit controls so that, if the instruction from the user accepted by the accepting unit is the skip instruction, the alternative data is reproduced in place of the data of the first replay segment for a period of time that the data of the first replay segment is not yet reproduced, and then the data of the second replay segment is reproduced.

The above apparatus prevents a total length of time for reproducing the content from extending because the alternative data is reproduced repeatedly due to the skip instruction by the user.

A content reproducing apparatus according to the present invention can also be a content reproducing apparatus, wherein the controlling unit controls so that, if the instruction from the user accepted by the accepting unit is the skip instruction, the alternative data is reproduced in place of the data of the first replay segment, and if a new skip instruction from the user is accepted by the accepting unit while the alternative data is being reproduced, the new skip instruction is made ineffective, and the data of the second replay segment is reproduced when the reproducing of the alternative data is completed.

By the above apparatus, the alternative data is reproduced without being skipped.

A content reproducing apparatus according to the present invention can also be a content reproducing apparatus, wherein the obtaining unit obtains a plurality of alternative data, and the controlling unit controls so that, if the instruction from the user accepted by the accepting unit is the skip instruction, a first alternative data is reproduced in place of the data of the first replay segment, and a second alternative data is reproduced if a new skip instruction from the user is accepted by the accepting unit while the first alternative data is being reproduced, and the data of the second replay segment is reproduced when the reproducing of one of the plurality of alternative data is completed, the first alternative data being one of the plurality of alternative data, the second alternative data being one of the plurality of alternative data different from the first alternative data.

By the above apparatus, even when reproduction of the alternative data is skipped, another alternative data is reproduced, and reproduction of the main part of the content does not resume until reproduction of one of the alternative data is completed. Therefore, it is possible to reproduce the data which the content provider intends.

A content reproducing apparatus according to the present invention can also be a content reproducing apparatus, wherein the obtaining unit obtains alternating order information and a plurality of alternative data, the alternating order information indicating an order in which the plurality of alternative data are selected, and the controlling unit controls so that, if the instruction from the user accepted by the accepting unit is the skip instruction, a selected alternative data selected based on the alternating order information is reproduced in place of the data of the first replay segment, and the data of the second replay segment is reproduced when the reproducing of the selected alternative data is completed.

By the above apparatus, it is possible to reproduce the alternative data in an order which the content provider intends.

A content reproducing apparatus according to the present invention can also be a content reproducing apparatus, wherein the controlling unit controls so that, if the instruction from the user accepted by the accepting unit is the skip instruction, a primary alternative data set for the first replay segment in advance is reproduced in place of the data of the first replay segment, and the data of the second replay segment is reproduced when the reproducing of the alternative data is completed.

By the above apparatus, it is possible to reproduce the alternative data which the content provider intends.

A content reproducing apparatus according to the present invention can also be a content reproducing apparatus further comprising: a designation accepting unit operable to accept a designation of the alternative data from the user, wherein the obtaining unit obtains a plurality of alternative data, and the controlling unit controls so that, if the instruction from the user accepted by the accepting unit is the skip instruction, a designated alternative data that is designated by the user is reproduced in place of the data of the first replay segment, and the data of the second replay segment is reproduced when the reproducing of the designated alternative data is completed.

By the above apparatus, the user can select the alternative data of the user's preference.

A content reproducing apparatus according to the present invention can also be a content reproducing apparatus, wherein the additional information further indicates correspondence between each replay segment that is unskippable and the alternative data, and the control unit controls so that, only when the judgment result in the judging unit is negative, the alternative data which corresponds to the first replay segment based on the additional information is reproduced in place of data of the first replay segment, and the data of the second replay segment is reproduced when the reproducing of the alternative data is completed.

By the above apparatus, when the skip instruction instructs to skip an unskippable replay segment, the alternative data corresponds to the replay segment according to the additional information is reproduced. Accordingly, it is possible to reproduce the alternative data which the content provider intends.

A content reproducing apparatus according to the present invention can also be a content reproducing apparatus, wherein the additional information further indicates correspondence between each replay segment that is unskippable and a plurality of alternative data, and the controlling unit controls so that, only when the judgment result in the judging unit is negative, a first alternative data that corresponds to the first replay segment based on the additional information is reproduced in place of the data of the first replay segment, and if a new skip instruction from the user is accepted by the accepting unit while the first alternative data is being reproduced, a second plurality of alternative data that corresponds to the first replay segment is reproduced, and the data of the second replay segment is reproduced when the reproducing of any of the plurality of alternative data that corresponds to the first replay segment is completed, the first alternative data being one of the plurality of alternative data, the second alternative data being one of the plurality of alternative data and different from the first alternative data.

By the above apparatus, when the skip instruction instructs to skip the unskippable replay segment, the entire data of one of the plurality of alternative data corresponds to the replay segment according to the additional information is reproduced. Accordingly, it is possible to reproduce the alternative data which the content provider intends.

A content reproducing apparatus according to the present invention can also be a content reproducing apparatus, wherein the additional information further indicates an order in which a plurality of alternative data are selected, and the controlling unit controls so that, only when the judgment result in the judging unit is negative, a selected alternative data selected based on the order indicated in the additional information is reproduced in place of the data of the first replay segment, and the data of the second replay segment is reproduced when the reproducing of the selected alternative data is completed.

By the above apparatus, when the skip instruction instructs to skip the unskippable replay segment, one of the plurality of alternative data corresponds to the replay segment according to the additional information is selected and reproduced based on the alternating order. Accordingly, it is possible to reproduce the alternative data which the content provider intends.

A content reproducing apparatus according to the present invention can also be a content reproducing apparatus further comprising: a determining unit operable to determine, only when the judgment result in the judging unit is negative and the alternative data does not correspond to the first replay segment in additional information, whether or not to make the skip instruction ineffective depending on if at least a part of data of a third replay segment is skipped, the third replay segment being located before the first replay segment on a reproducing time-line of the content.

By the above apparatus, skipping of unskippable replay segment is suppressed when the skip instruction is given to the unskippable replay segment.

A content reproducing apparatus according to the present invention can also be a content reproducing apparatus, wherein the additional information further indicates an attribute of each replay segment, and the determining unit determines, only when the judgment result in the judging unit is negative and the alternative data does not correspond to the first replay segment in additional information, whether or not to make the skip instruction ineffective depending on if at least a part of data of a fourth replay segment is skipped, the fourth replay segment having a same attribute as the first replay segment being located before the first replay segment on a reproducing time-line of the content.

By the above apparatus, it is possible to determine whether or not to make the skip instruction ineffective based on the group of the alternative date categorized by the attributes. Accordingly, it is possible to avoid that only CMs of a specific sponsor is skipped.

A content reproducing apparatus according to the present invention can also be a content reproducing apparatus further comprising: an accept number storing unit operable to count and store an accept number, the accept number indicating how many times the skip instruction from the user is accepted, wherein the determining unit determines to make the skip instruction ineffective if the accept number is larger than a predetermined threshold value.

By the above apparatus, the skip instruction is made ineffective when the accept number of the skip instructions becomes larger than the threshold value, and it is possible to suppress skipping the unskippable replay segment.

A content reproducing apparatus according to the present invention can also be a content reproducing apparatus further comprising: a user information obtaining unit operable to obtain user information which is information about the user; and a user threshold value setting unit operable to set the threshold value based on the obtained user information, wherein the determining unit determines to make the skip instruction accepted from the user by the accepting unit ineffective, if the accept number is larger than the threshold value set by the user threshold value setting unit.

By the above apparatus, the threshold is set based on the user information such as the amount of payment the user made for the content; the more the user pays, the higher the threshold becomes. Examples of the user information include gender and age.

A content reproducing apparatus according to the present invention can also be a content reproducing apparatus further comprising: a time corresponding threshold value setting unit operable to set the threshold value corresponding to a length of time that is required to reproduce an entire part of the content, wherein the determining unit determines to make the skip instruction accepted from the user by the accepting unit ineffective, if the accept number is larger than the threshold value set by the time corresponding threshold value setting unit.

By the above apparatus, the threshold is set based on the total length of time for reproducing the content.

A content reproducing apparatus according to the present invention can also be a reproducing apparatus comprising: a reproducing unit operable to reproduce a content, the content being stream data divided into a plurality of replay segments; an attribute information obtaining unit operable to obtain attribute information indicating an attribute of each of the plurality of replay segments; a designation accepting unit operable to accept a designation of one of the plurality of replay segments; a detecting unit operable to detect, when the designation accepting unit accepts the designation of a second replay segment from a user while data of a first replay segment is being reproduced, whether or not a replay segment having a certain attribute exists between the first replay segment and the second replay segment by referring to the attribute information, the first replay segment being one of replay segments in the content, the second replay segment being located after the first replay segment on a reproducing time-line of the content; and a controlling unit operable to control so that, only when at least one replay segment having the certain attribute exists between the first replay segment and the second replay segment, the replay segment having the certain attribute is selected and reproduced, and then data of the second replay segment is reproduced.

A content reproducing apparatus according to the present invention can also be a content reproducing apparatus, wherein the controlling unit controls so that, when a plurality of replay segments having the certain attribute exist between the first replay segment and the second replay segment, the replay segment having the certain attribute and to be reproduced first according to an order of reproduction is selected from the plurality of replay segments and reproduced, and then the data of the second replay segment is reproduced, a content reproducing apparatus, wherein the controlling unit controls so that, when a plurality of replay segments having the certain attribute exist between the first replay segment and the second replay segment, the replay segment having the certain attribute and to be reproduced last according to an order of reproduction is selected from the plurality of replay segments and reproduced, and then the data of the second replay segment is reproduced, and a content reproducing apparatus, wherein the controlling unit controls so that, when a plurality of replay segments having the certain attribute exist between the first replay segment and the second replay segment, the replay segment having the certain attribute is selected randomly from the plurality of replay segments and reproduced, and then the data of the second replay segment is reproduced.

By the above apparatus, when there is more than one unskippable replay segment between the replay segment that is being reproduced and the target replay segment, data of at least one of the replay segment is reproduced. Accordingly, it is possible to reproduce the alternative data which the content provider intends without fail.

A system that transmit and receive content according to the present invention is a content transmitting/receiving system comprising: a content receiving/reproducing apparatus; and a content transmitting apparatus, the content receiving/reproducing apparatus including: a reproducing unit operable to reproduce a content while sequentially receiving the content by a packet, the content being stream data divided into a plurality of replay segments; an accepting unit operable to accept an instruction from a user while the content is being reproduced; and a notifying unit operable to, if the instruction is a skip instruction that instructs skipping reproduction of data of a first replay segment, notify the content transmitting apparatus of specifying information to specify the first replay segment, the first replay segment being one of the plurality of replay segments in the content, the content transmitting apparatus including: a transmitting unit operable to break the content into a plurality of packets and transmit the content sequentially by the packet; an alternative data storing unit operable to store a plurality of alternative data which is reproducible by the content receiving/reproducing apparatus; and a controlling unit operable to control so that, when notified of the specifying information, an alternative data is transmitted in place of data that is being transmitted, and data of a second replay segment is transmitted when transmitting the alternative data is completed, the second replay segment being located after the first replay segment on a reproducing time-line of the content.

By the above apparatus, it is possible to reproduce the alternative data which the content provider intends while tolerating skipping of the reproduction of the data of the specific replay segment as much as possible in a case the skip instruction to the replay-segment from the user is accepted.

A system that transmit and receive content according to the present invention can also be a content transmitting/receiving system, wherein the content transmitting apparatus further comprises: an additional information storing unit operable to store additional information indicating whether or not reproducing data of each of one of the plurality of replay segments in the content is skippable; and a judging unit operable to judge, when the specifying information is notified by the notifying unit, whether or not reproducing data of the first replay segment specified by the specifying information is skippable by referring to the additional information, and wherein the control unit controls so that, only when a judgment result in the judging unit is negative, the alternative data stored in the alternative data storing unit is transmitted in place of the data that is being transmitted, and the data of the second replay segment is reproduced when the reproducing of the alternative data is completed.

By the above apparatus, it is possible to judge whether or not the reproduction of the replay segment pointed out by the skip instruction is skippable, based on the additional information of the content.

A system that transmit and receive content according to the present invention can also be a content transmitting/receiving system, wherein
  the additional information further indicates correspondence between each of the plurality of replay segments that is unskippable and the alternative data, and
  the control unit controls so that, only when the judgment result in the judging unit is negative, the alternative data which corresponds to the first replay segment based on the additional information is transmitted in place of data that is being transmitted, and the data of the second replay segment is reproduced when the reproducing of the alternative data is completed.

By the above apparatus, it is possible to reproduce the alternative data which the content provider intends, because the alternative data primarily corresponds to the replay segment in the additional information for the unskippable replay segment pointed out by the skip instruction.

A system that transmit and receive content according to the present invention can also be a content transmitting/receiving system, wherein the additional information further indicates correspondence between a first alternative data with a second alternative data, and the control unit controls so that, when the specifying information notified by the notifying unit indicates the first alternative data, the second alternative data that corresponds to the first alternative data by referring to the additional information is transmitted in place of the data that is being transmitted.

By the above apparatus, when the skip instruction to skip the first alternative data is given, the second alternative data corresponds to the first alternative data is transmitted. Accordingly, it is possible to reproduce the data which the content provider intends in the content receiving/reproducing apparatus.

A system that transmit and receive content according to the present invention can also be a content transmitting/receiving system, wherein the content transmitting apparatus further comprises: a selecting unit operable to select the alternative data stored in the alternative data storing unit based on a predetermined priority when specifying information is notified by the notifying unit, and wherein the control unit controls so that, when the specifying information is notified by the notifying unit, the alternative data selected by the selecting unit is transmitted in place of data that is being transmitted, and the data of the second replay segment is reproduced when the reproducing of the alternative data is completed, a content transmitting/receiving system, wherein the predetermined priority is based on a reverse order of date in which the alternative data is stored, and a content transmitting/receiving system, wherein at least one of the plurality of alternative data stored in the alternative storing unit is a corresponding alternative data, the corresponding alternative data having a subject corresponds to a subject of a main part of the content and being given higher priority than the alternative data.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 is a table of additional information of content shown in FIG. 2;

FIG. 7 is a table of additional information of content shown in FIG. 6;

FIG. 9 is a table of an example for alternative data additional information;

FIG. 11 is a table of another example for alternative data additional information;

FIG. 13 is a table of additional information of content shown in FIG. 12;

FIG. 20 is a structural functional diagram of a content reproducing apparatus according to the fourth embodiment.

DESCRIPTION OF THE PREFERRED EMBODIMENTS

The following describes a content reproducing apparatus for reproducing content that is stream data divided into a plurality of reply segments, and a content transmitting/receiving system according to preferred embodiments of the present invention.

Figure 19:
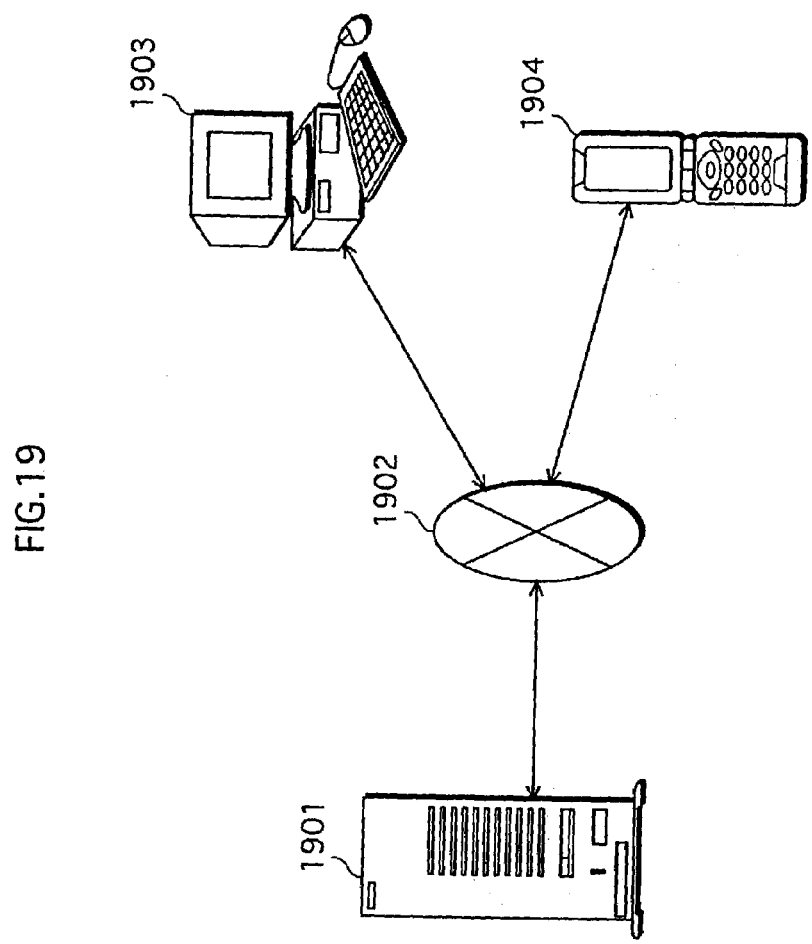
FIG. 19 is a diagram illustrating an example of a system that includes the content reproducing apparatus according to the present invention.

FIG. 19 is an overview diagram illustrating an example of a system that includes the content reproducing apparatus according to the present invention. The system illustrated here is a content distributing system in which a content is arranged dynamically by including a plurality of multimedia data according to a user request and the content is transmitted to the content reproducing apparatus that has notified of the request from the user. The content referred to in this context is stream data such as video and music, and contains a CM, which is an advertisement of a sponsor, in addition to a main content arranged according to the user request.

A content transmitting apparatus 1901 arranges a content according to the user request that has been notified from either a content reproducing apparatus 1903 or a content reproducing apparatus 1904. The content transmitting apparatus 1901 then transmits the content, additional information, and an alternative data to the content reproducing apparatus that has sent the user request, via a network 1902. The additional information indicates whether reproduction of each replay segment of the content is skippable. The alternative data is stream data to be reproduced in place of data of a replay segment that is unskippable.

When the content, the additional information, and the alternative data are received, the content reproducing apparatus reproduces the content upon accepting a reproducing instruction from the user. When a skip instruction from the user is accepted while the content is being reproduced, the content reproducing apparatus refers to the additional information to judge whether or not data of the replay segment pointed out by the skip instruction is skippable. When a result of the judgment is negative, the alternative data is reproduced in place of the data of the replay segment pointed out by the skip instruction. When reproducing the alternative data is completed, the content reproducing apparatus reproduces data of a replay segment successive to the replay segment pointed out by the skip instruction.

Examples of content reproducing apparatuses include mobile devices, set-top boxes, and personal computers.

Explanations of each embodiment regarding content reproducing apparatuses and content transmitting/receiving systems according to the present invention are given below.

First Embodiment

[Construction 1]

Figure 1:
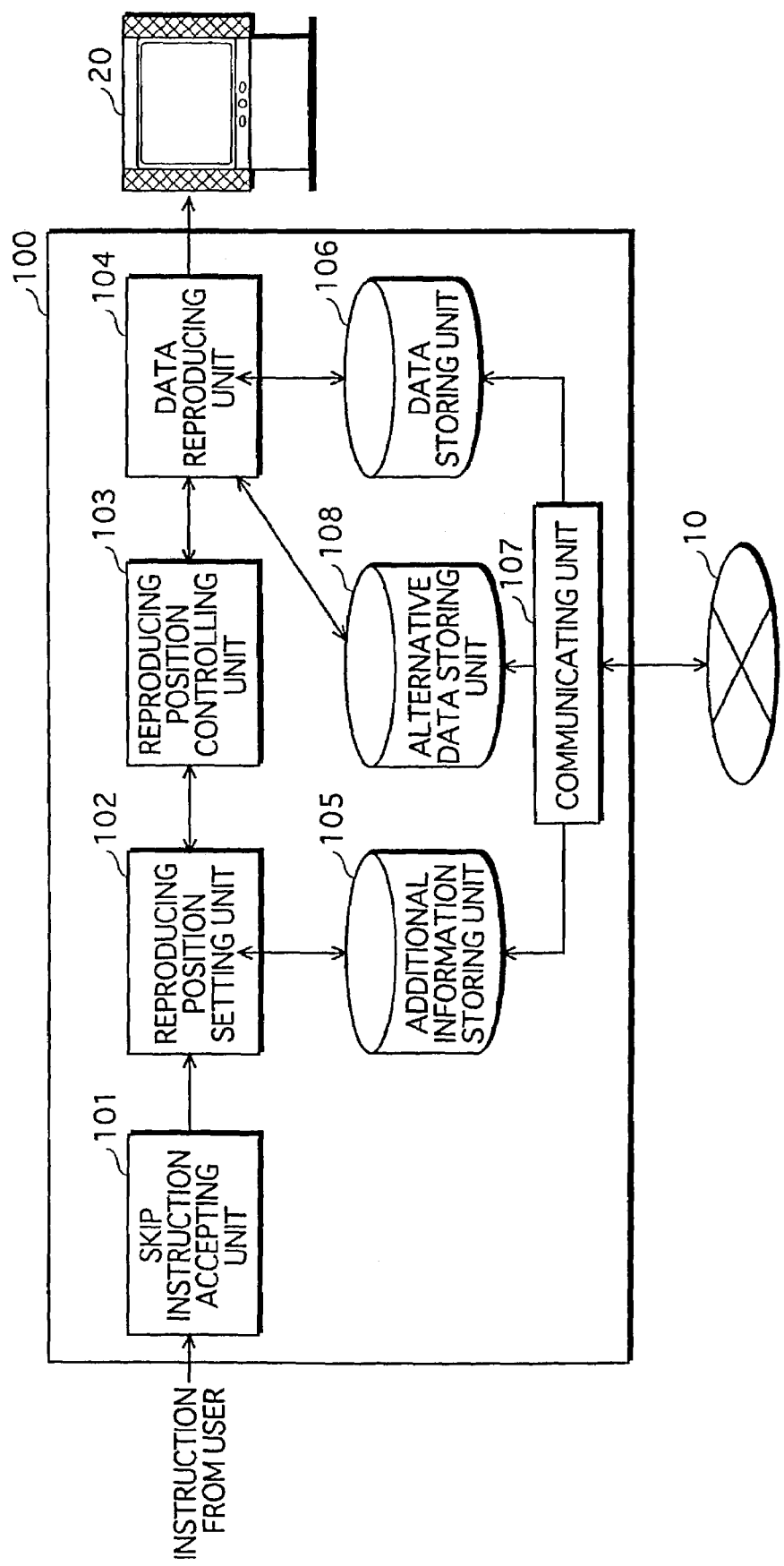
FIG. 1 is a structural functional diagram of a content reproducing apparatus according to a first embodiment.

A detailed explanation about a construction of a content reproducing apparatus according to the present embodiment is given below. FIG. 1 is a structural functional diagram of the content reproducing apparatus.

As hardware, a content reproducing apparatus 100 comprises a CPU, an input/output unit, a memory, a hard disk and the like. Functionally, the content reproducing apparatus 100 comprises a skip instruction accepting unit 101, a reproducing position setting unit 102, a reproducing position controlling unit 103, a data reproducing unit 104, an additional information storing unit 105, a data storing unit 106, a communicating unit 107, and an alternative data storing unit 108. Each functional operation of the content reproducing apparatus 100 is performed by the CPU executing a control program stored in the memory. Note that an explanation about functions that are not essential to the present invention is not given.

The communicating unit 107 has a two-way communication function. For example, the communicating unit 107 transmits a piece of content request information, which indicates the request for the content, to a content transmitting apparatus, and receives the content, the additional information, the alternative data, and the like, transmitted from the content transmitting apparatus.

The data storing unit 106 is a storage medium such as a hard disk for storing received content.

The alternative data storing unit 108 is a storage medium such as a hard disk for storing received alternative data. The alternative data storing unit 108 stores a plurality of alternative data, and each alternative data is identified by an alternative data ID.

The additional information storing unit 105 is a storage medium such as a hard disk for storing received additional information.

The reproducing position controlling unit 103 has a function for controlling the position of data to be read by the data reproducing unit 104, i.e., the reproducing position, when the reproducing of the content that is stored in the data storing unit 106. In a case in which an instruction is given by the reproducing position setting unit 102, the reproducing position controlling unit 103 follows the instruction.

The data reproducing unit 104 has a function for reading the data at the reproducing position indicated by the control of the reproducing position controlling unit 103, and reproducing the data. The reproduced data is output by a display apparatus 20 as an image or sound.

The skip instruction accepting unit 101 has a function for accepting a skip instruction from a user. The skip instruction is transmitted as an electrical signal when the user presses a skip button that is provided to a main body of the content reproducing apparatus 100 or a remote control thereof. The accepted skip instruction is transmitted to the reproducing position setting unit 102.

The reproducing position setting unit 102 has a function for referring to additional information stored in the additional information storing unit 105 when the skip instruction is transmitted from the skip instruction accepting unit 101, and judging whether or not the data of a replay segment including a current reproducing position indicated by the reproducing position controlling unit 103 is skippable. Then, when a result of the judgment is affirmative on the replay segment that includes the current reproducing position, the reproducing position setting unit 102 sets a beginning of a replay segment which is successive to the current replay segment as a reproducing positions and instructs the reproducing position controlling unit 103 to change the reproducing position.

In addition, when the result of the judgment is negative and if the alternative data to be reproduced in place of the skipped data is indicated in the additional information, the reproducing position setting unit 102 instructs the reproducing position controlling unit 103 to reproduce the alternative data stored in the alternative data storing unit 108. Then, when the reproducing of the alternative data is completed, the reproducing position setting unit 102 sets the beginning of the successive replay segment to the replay segment pointed out by the skip instruction as the reproducing position, and instructs the reproducing position controlling unit 103 to change the reproducing position.

Moreover, when the result of the judgment is negative and if the alternative data to be reproduced in place of the skipped data is not indicated in the additional information, the reproducing position setting unit 102 judges whether or not to make the skip instruction ineffective. The judgment is done based on a accept number indicating how many times the skip instruction is accepted from the user, and a threshold value in the additional information. When the accept number is larger than the threshold value, the reproducing position setting unit 102 judges to make the skip instruction ineffective. When the skip instruction is made ineffective, the reproducing position setting unit 102 does not give any instruction to the reproducing position controlling unit 103, and the data of the replay segment including the current reproducing position continues to be reproduced. When the accept number is smaller than the threshold value, as with the case in which the result of the judgment is affirmative, the reproducing position setting unit 102 sets the beginning of the replay segment which is successive to the current replay segment as the reproducing position, and instructs the reproducing position controlling unit 103 to change the reproducing position.

[Data 1]

Next, an explanation about the content, the alternative data, and the additional information according to the present embodiment is given below.

Figure 2:
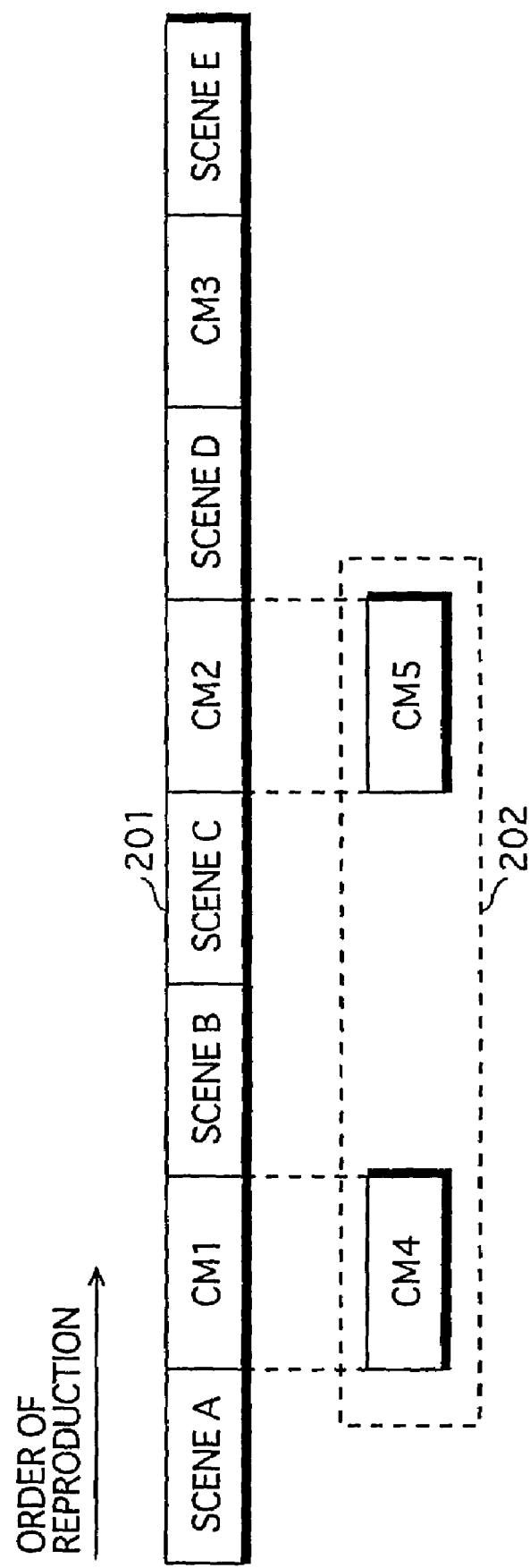
FIG. 2 schematically shows an example of content according to the present invention.

FIG. 2 schematically shows a content that includes CM data and alternative data to be reproduced in place of the CM data in a case where the CM data is skipped. The content reproducing apparatus 100 reproduces the content 201 in an order of a scene A, a CM1, a scene B, a scene C, a CM2, and a scene D . . . , unless the instruction from the user, such as skipping and rewinding, is accepted. The additional information indicates correspondence between the CM1 and the alternative data CM4, and between the CM2 and the alternative data CM5. When the skip instruction from the user is accepted while the CM1 is being reproduced, the CM4, the alternative data of the CM1, is reproduced, and reproducing the scene B starts when the reproducing the CM4 is completed. Likewise, when the skip instruction from the user is accepted while the CM2 is reproduced, the CM5, the alternative data of the CM2, is reproduced, and reproducing the scene D starts when the reproducing of the CM5 is completed.

FIG. 3 is an additional information table of the content 201. In a table of additional information 301, a vertical direction shows a time-line of the replay segments to be reproduced, and fields in a horizontal direction show various information about each replay segment.

The information shown in the additional information table 301 includes an ID, a reproducing position information that shows the reproducing position for the replay segment corresponding to the ID, a skip attribute, an alternative data ID, a threshold value information, and such.

The ID is an identifier to identify data of each replay segment stored in the data storing unit 106.

The reproducing position information comprises a reproducing starting position and a reproducing ending position. The reproducing position information is the information to identify to which time-block on the reproducing time-line of the content 201 each replay segment corresponds.

The skip attribute is information to indicate whether or not reproduction of data of each replay segment is skippable. In FIG. 3, "◯" indicates that the replay segment is skippable, and "X" indicates that the replay segment is unskippable.

The alternative data ID is an identifier to identify each alternative data stored in the alternative data storing unit 108.

Although not shown in the figure, the threshold value information is the information that is used in judging whether or not the skip instruction is made ineffective.

[Operation 1]

Next, an explanation about an operation of the content reproducing apparatus according to the present embodiment is given.

Figure 4:
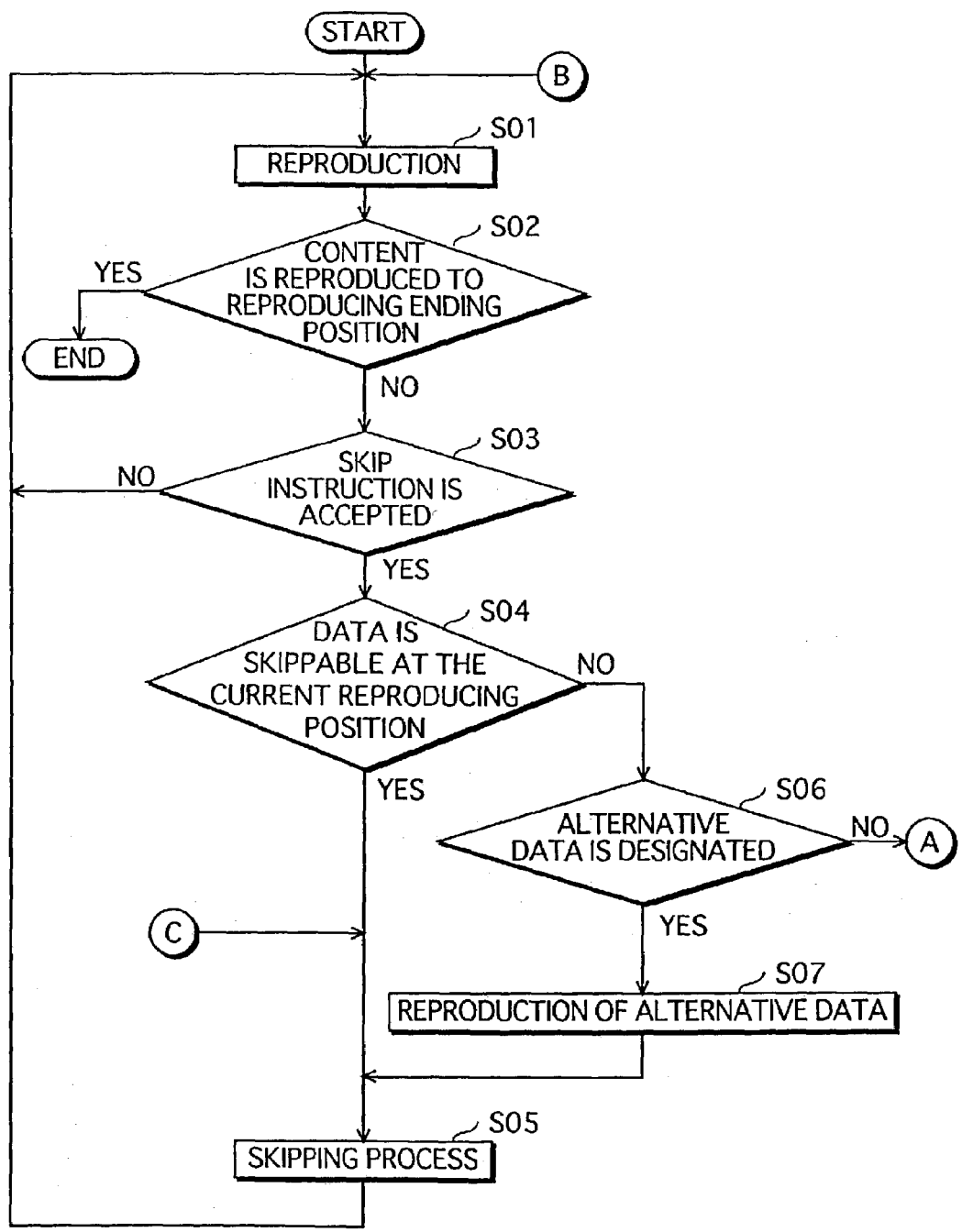
FIG. 4 is a flow chart showing a part of content reproduction control of the content reproducing apparatus according to the first embodiment.
Figure 5:
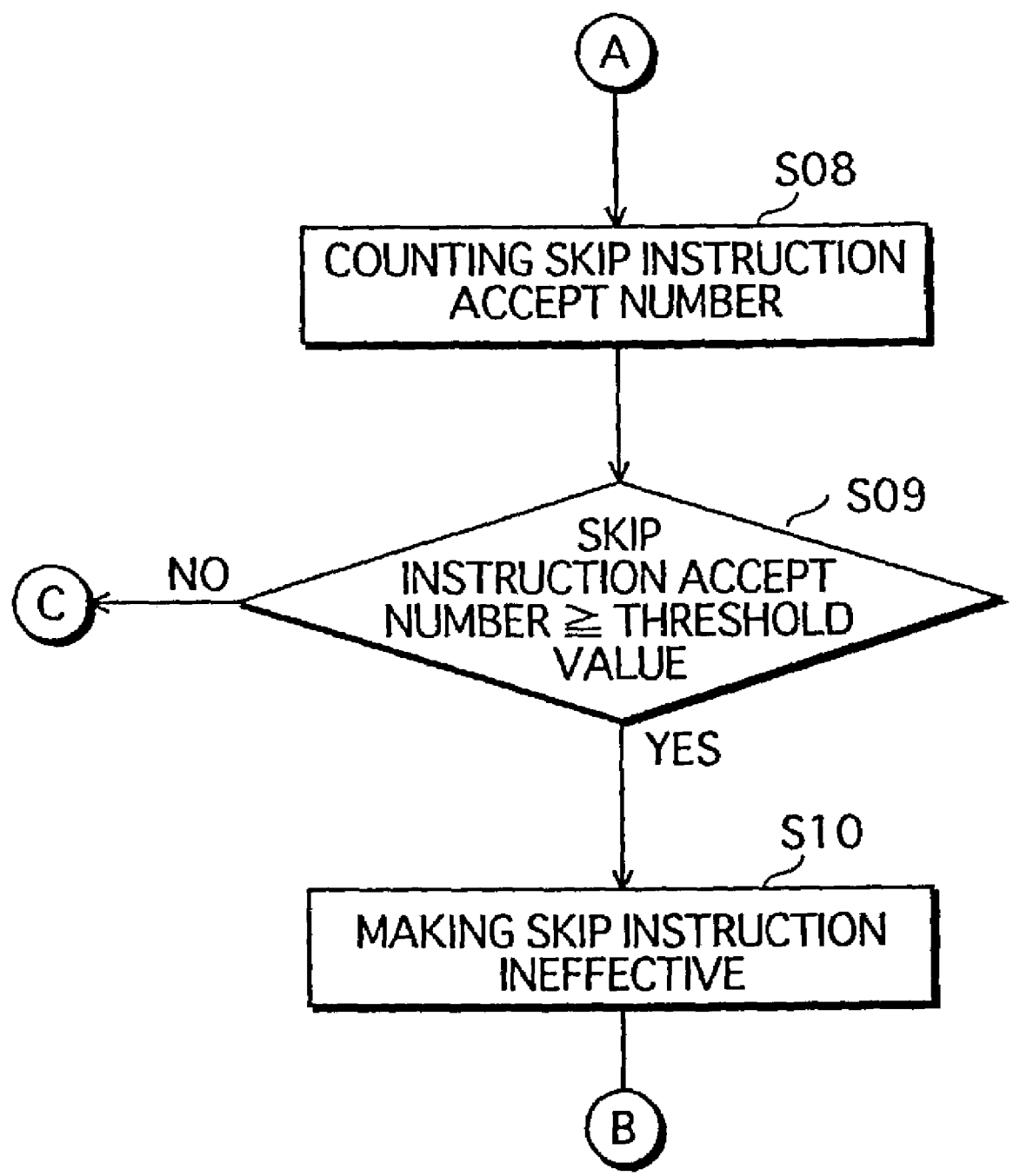
FIG. 5 is a flow chart showing a part of content reproduction control of the content reproducing apparatus according to the first embodiment and a fifth embodiment.

FIGS. 4 and 5 are flow charts showing content reproduction control of the content reproducing apparatus according to the present embodiment.

First, the data reproducing unit 104 reads data of the reproducing position, which is controlled by the reproducing position controlling unit 103, from the data storing unit 106 and reproduces the data (S01).

The reproducing position setting unit 102 judges whether or not the reproducing position obtained from the reproducing position controlling unit 103 is the reproducing ending position of the content by referring to the additional information stored in the additional information storing unit 105 (S02). If the content is reproduced to the reproducing ending position (S02:YES), the reproduction ends. If the content is not reproduced to the reproducing ending position (S02:NO), the operation moves to S03.

In S03, if the skip instruction accepting unit 101 accepts the skip instruction from the user (S03:YES), the operation moves to S04. If the skip instruction accepting unit 101 does not accepts the skip instruction, the operation returns to S01.

In S04, the reproducing position setting unit 102 refers to the additional information and judges whether or not reproduction of the replay segment that includes the current reproducing position obtained from the reproducing position controlling unit 103 is skippable. If skippable (S04:YES), the operation moves to S05. If unskippable (S04:NO), the operation moves to S06.

In S05, the reproducing position setting unit 102 executes a skipping operation. In the skipping operation, the reproducing position setting unit 102 sets the starting position of the replay segment, which is successive to the replay segment that includes the current reproducing position, as a reproducing position. The reproducing position setting unit 102 then instructs the reproducing position controlling unit 103 to change the reproducing position. Then the operation returns to S01.

In S06, the reproducing position setting unit 102 refers to the additional information, and confirms if there is the alternative data corresponding to the replay segment that includes the current reproducing position. More specifically, the reproducing position setting unit 102 refers to the additional information table 301 in FIG. 3, and confirms if an alternative data ID is indicated in the alternative data ID field of the replay segment that includes the current reproducing position. If the alternative data is not specified (S06:NO), the operation moves to S08, and if the alternative data is specified (S06:YES), the operation moves to S07.

In S07, the reproducing position setting unit 102 notifies the reproducing position controlling unit 103 of the alternative data ID indicated in the additional information, and the reproducing position controlling unit 103 have the data reproducing unit 104 read the alternative data corresponding to the alternative data ID from the alternative data storing unit 108 and reproduce the alternative data. When the reproducing of the alternative data is completed, the operation moves to S05, and the skip operation is executed.

In S08, the reproducing position setting unit 102 counts the accept number of the skip instructions. Then in S09, the reproducing position setting unit 102 compares the accept number of the skip instructions and a maximum threshold value indicated in the additional information. If the accept number is larger than the maximum threshold value (S09:YES), the reproducing position setting unit 102 judges to make the skip instruction ineffective (S10). If the accept number is smaller than the maximum threshold value (S09:NO), the operation returns to S01.

The operation is explained more specifically below. When the skip instruction from the user is accepted while the scene A of the content 201 in FIG. 2 is being reproduced, for example, the content reproducing apparatus 100 judges whether or not reproducing the replay segment that includes the current reproducing position is skippable, based on the current reproducing position obtained from the reproducing position controlling unit 103 and the additional information. According to the additional information table 301 in FIG. 3, the skip attribute for the scene A is "○", and therefore reproducing the data in the replay segment for the scene A is skippable. Accordingly, reproducing the data of the scene A is skipped and reproducing the data of the CM1 which is successive to the scene A starts.

Further, when the skip instruction from the user is accepted while the CM1 is being reproduced, the content reproducing apparatus 100 judges whether or not reproducing the replay segment that includes the current reproducing position is skippable, based on the current reproducing position obtained from the reproducing position controlling unit 103 and the additional information. According to the additional information table 301 in FIG. 3, the skip attribute for the CM1 is "x", and therefore reproducing the data in the replay segment for the CM1 is unskippable. In addition, because an identifier for the CM4 is indicated in the alternative data ID field in the additional information, reproducing the data of the CM4 in place of the CM1 starts. When the reproducing of the data of the CM4 is completed, reproducing the data of the scene B which is successive to the CM1 starts.

Further, when the skip instruction from the user is accepted while the CM3 is being reproduced, the content reproducing apparatus 100 judges whether or not reproducing the replay segment that includes the current reproducing position is skippable, based on the current reproducing position obtained from the reproducing position controlling unit 103 and the additional information. According to the additional information table 301 in FIG. 3, the skip attribute for the CM3 is "x", and therefore reproducing the data in the replay segment for the CM3 is unskippable. Moreover, in the alternative data ID field in the additional information, no information is indicated. Accordingly, the content reproducing apparatus 100 counts the accept number of the skip instructions, and compares the accept number and the threshold value. When the accept number is larger than the threshold value, the content reproducing apparatus 100 makes the skip instruction from the user ineffective and continues reproducing the CM3.

On the other hand, when the accept number of the skip instructions is smaller than the threshold value, the content reproducing apparatus 100 skips reproducing the CM3, and starts reproducing the scene E which is successive to the CM3.

Note that while the alternative data is being reproduced, the content reproducing apparatus according to the present embodiment makes skip instructions ineffective and lifts the ineffectiveness of skip instructions when the reproducing of the alternative data is completed.

Second Embodiment

An explanation about a content reproducing apparatus according to a second embodiment is given below.

The content reproducing apparatus according to the present embodiment is such that the functional structure of a first embodiment further includes a new function. The new function is for providing users with options of categories for the alternative data to be reproduced in place of the data of the skippable replay segment, and accepting a user's selection. A plurality of alternative data are categorized according to the additional information. Examples of the categories include automobile, cell phone, finance, and such. The content reproducing apparatus displays a list of the categories on a display apparatus before starting reproduction of the content, and accepts the user's selection.

Figure 6:
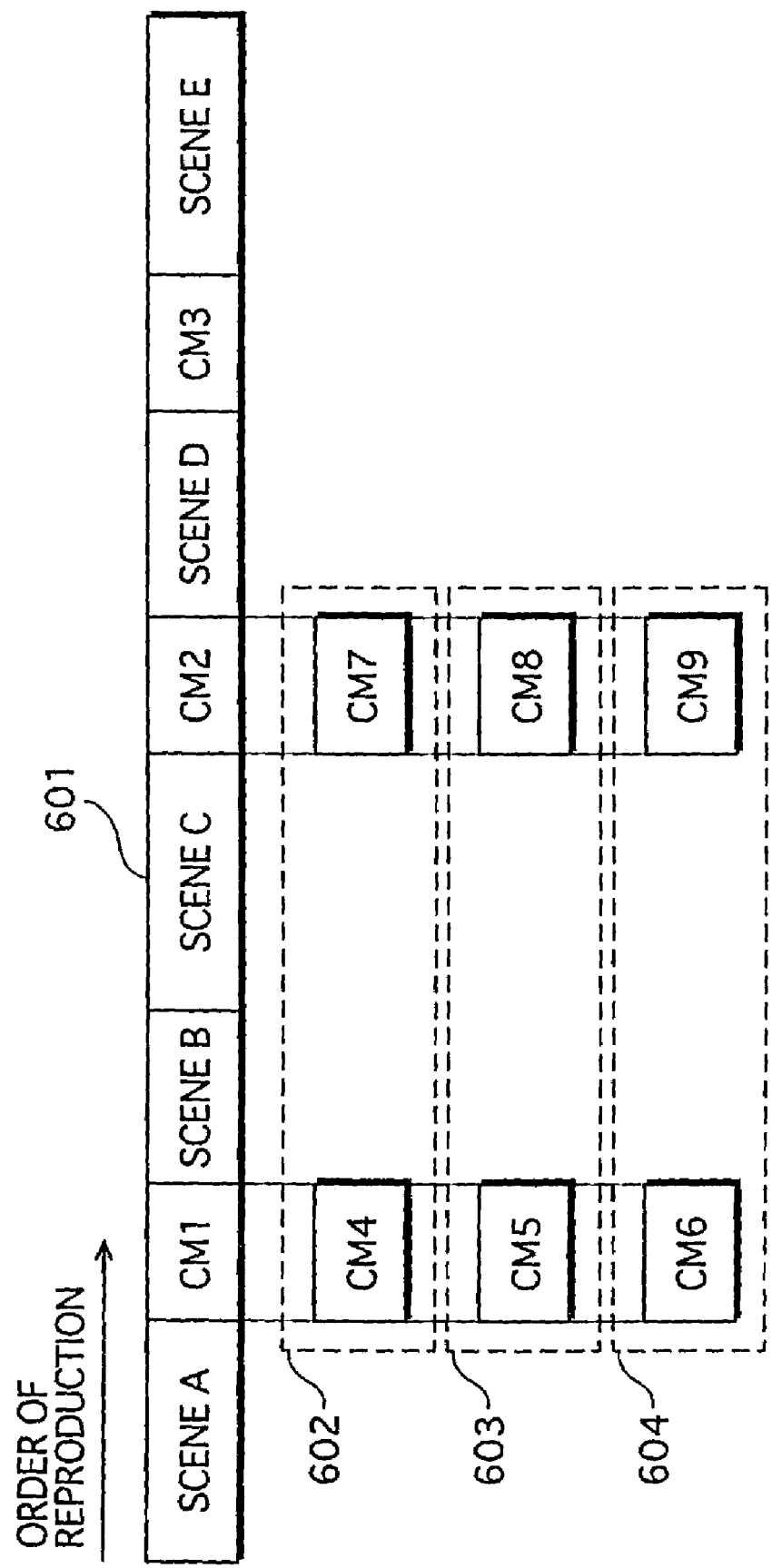
FIG. 6 schematically shows another example of content according to the present invention.

FIG. 6 schematically shows a content that includes CM data, and the plurality of alternative data to be reproduced when skipping reproducing the CM data. The plurality of alternative data are classified into three categories: a category 602, a category 603, and a category 604.

FIG. 7 is an additional information table of the content 601. A CM1 corresponds to the alternative data, a CM4, a CM5, and a CM6, and a CM2 corresponds to a CM7, a CM8, and a CM9.

The user selects one of the categories 602, 603, and 604 before starting reproduction of the content. When the user instructs to skip the data of the unskippable replay segment, the alternative data in the category selected by the user is reproduced in place of the data that the user has instructed to skip.

Third Embodiment

An explanation about a content reproducing apparatus according to a third embodiment is given below.

In the first embodiment, when the skip instruction from the user is accepted while the alternative data is being reproduced, the skip instruction is made ineffective. In the third embodiment, the skip instruction is not made ineffective, and reproduces another alternative data instead. When the reproducing of one of the plurality of alternative data is completed, reproduction of the main content resumes.

[Construction 3]

Next, an explanation about a construction of the content reproducing apparatus according to the present embodiment is given.

Figure 8:
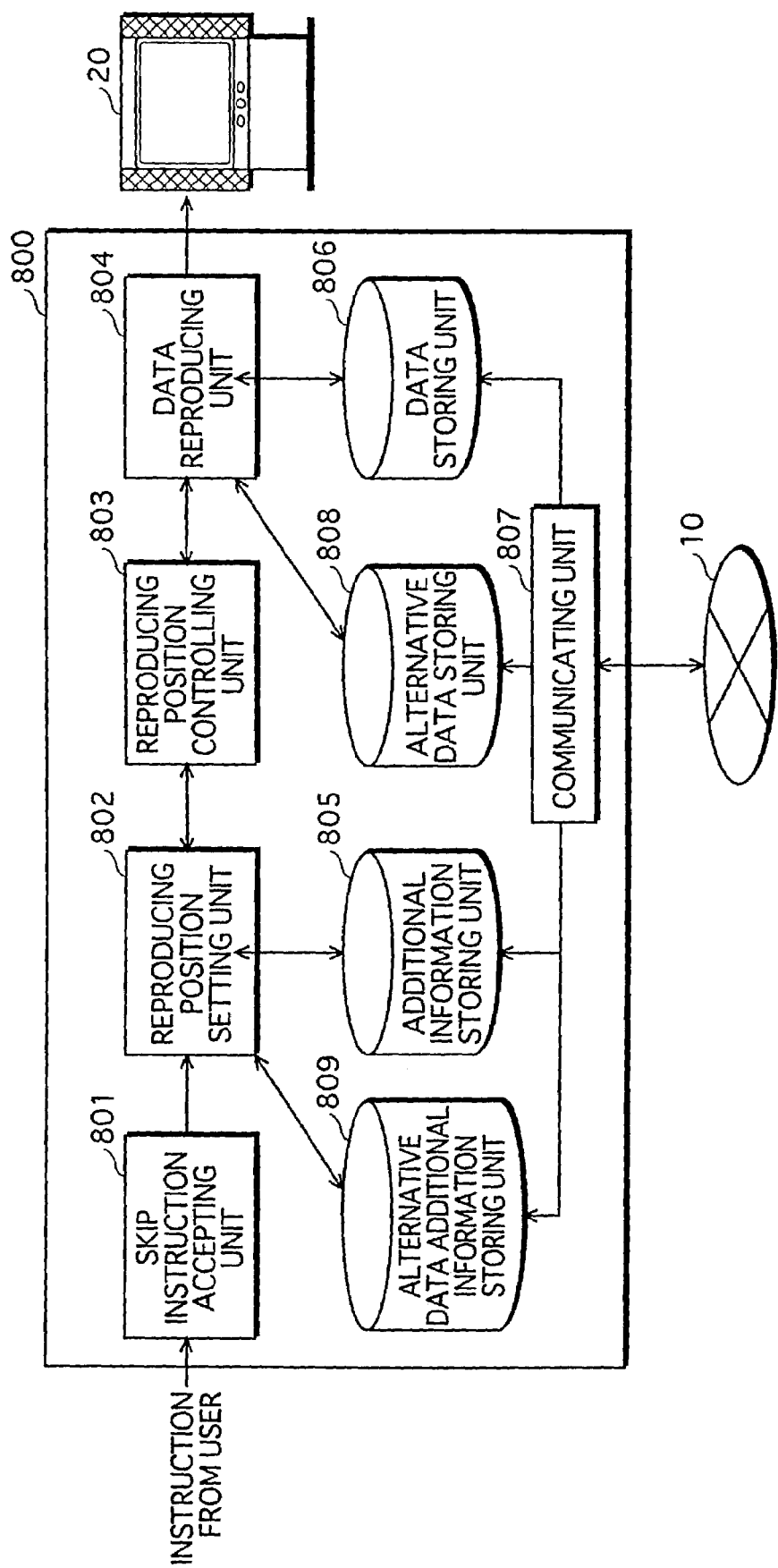
FIG. 8 is a structural functional diagram of a content reproducing apparatus according to a third embodiment.

FIG. 8 is a structural functional diagram of the content reproducing apparatus according to the present embodiment. A content reproducing apparatus 800 is such that the functional structure in the first embodiment further includes a new function. The new function is an alternative data determining process function for determining the alternative data to be reproduced in place of the data of the unskippable replay segment. The alternative data determination processing function is included in the reproducing position setting unit 802.

Further, the content reproducing apparatus 800 includes an alternative data additional information storing unit 809, which stores alternative data additional information used for determining the alternative data to be reproduced in place of the alternative data that is being reproduced. The reproducing position setting unit 802 determines the alternative data by referring to the alternative data additional information.

A skip instruction accepting unit 801, a reproducing position controlling unit 803, a data reproducing unit 804, an additional information storing unit 805, an alternative data storing unit 808, a data storing unit 806, and a communicating unit 807 each have the same function as the skip instruction accepting unit 101, the reproducing position controlling unit 103, the data reproducing unit 104, the additional information storing unit 105, the alternative data storing unit 108, the data storing unit 106, and the communicating unit 107, respectively, in FIG. 1 explained in the first embodiment.

[Data 3]

Next, an explanation about the alternative data determination processing function according to the present embodiment is given.

FIG. 9 is an alternative data additional information table. The alternative data additional information table 901 shows a skipped alternative data ID and a target alternative data ID associated with each other.

In additional information stored in the additional information storing unit 805, alternative data ID is indicated with correspondence to each unskippable replay segment.

[Operation 3]

Next, an explanation about an operation of the content reproducing apparatus according to the present embodiment is given.

Figure 10:
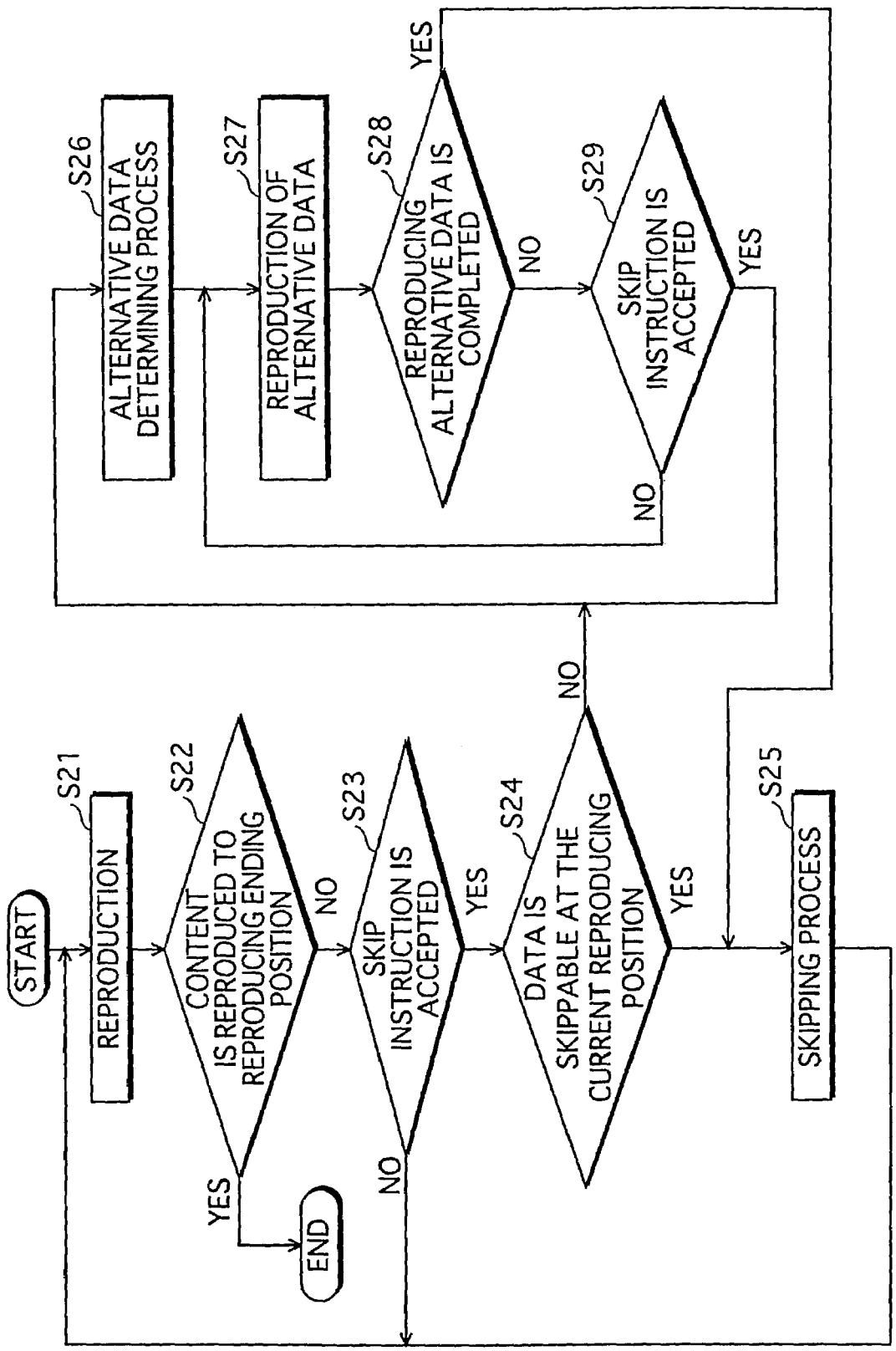
FIG. 10 is a flow chart showing content reproduction control of the content reproducing apparatus according to the third embodiment.

FIG. 10 is a flow chart showing content reproduction control of the content reproducing apparatus according to the third embodiment. Steps from S21 through S25 are the same as the steps S01 through S05 illustrated in the flow chart in FIG. 4 explained in the first embodiment. Therefore, the explanation given here is about steps from S26 through S29 that are different from the first embodiment.

First, in S24, when the reproducing position setting unit 802 judges a replay segment that includes the current reproducing position is unskippable based on additional information (S24:NO), the reproducing position setting unit 802 executes an alternative data determination process (S26).

In the alternative data determination process in S26, the reproducing position setting unit 802 instructs the reproducing position controlling unit 803 to reproduce the alternative data that corresponds to the replay segment that includes the current reproducing position and is indicated in the additional information. In a case in which the skip instruction is accepted in S29 while the alternative data is being reproduced, the reproducing position setting unit 802 instructs the reproducing position controlling unit 803 to reproduce a target alternative data corresponds to a skipped alternative data by referring to the alternative data additional information.

In S27, the reproducing position controlling unit 803 has the data reproducing unit 804 read the alternative data corresponding to the alternative data ID from the alternative data storing unit 808 and reproduce the same.

In S28, when the reproducing of the alternative data is completed (S28:YES), the operation moves to S25 and the skip operation is performed.

When, while the alternative data is being reproduced (S28:NO), a new skip instruction from the user is accepted (S29:YES), the operation returns to S26. When no skip instruction from the user is accepted (S29:NO) while the alternative data is being reproduced, the operation returns to S27 and continues to reproduce the alternative data.

Note that the content reproducing apparatus 800 can store an alternative data additional information table 1001 shown in FIG. 11, which is different from the alternative data additional information table 901 shown in FIG. 9. The alternative data additional information table 1001 is a table showing an order of alternative data to be reproduced when the content reproducing apparatus 800 accepts the skip instruction from the user.

When a skip instruction from the user is accepted while the alternative data is being reproduced, the content reproducing apparatus 800 determines the alternative data to be reproduced based on the order shown in the alternative data additional information table 1001 stored in the alternative data additional information storing unit 809. After a sixth alternative data is selected, the CM4 at the beginning of the list is selected again.

Fourth Embodiment

An explanation about a content reproducing apparatus according to a fourth embodiment is given below.

The content reproducing apparatus according to the fourth embodiment includes a function for accepting a designation for a target replay segment from the user while content is being reproduced, a function for detecting whether or not the replay segment of the CM exists between the current replay segment and the designated target replay segment, and a function for, when at least one replay segment of the CM is detected, selecting and reproducing one of replay segments of CMs, and reproducing the designated target replay segment when the reproducing of the data of the replay segment is completed.

[Construction 4]

An explanation of a functional structure of the content reproducing apparatus according to the present embodiment is given in accordance with FIG. 20. Functional units other than a target designation accepting unit 111 and a reproducing position setting unit 112 are the same as the units of the content reproducing apparatus according to the first embodiment, and explanations are made only for the target designation accepting unit 111 and the reproducing position setting unit 112.

The target designation accepting unit 111 has a function for accepting the designation for the target replay segment from the user while the content is being reproduced. The target replay segment is indicated by the ID. Information of each of number buttons on a numeric keypad of a remote control attached to the content reproducing apparatus 2000 corresponds to the ID for each replay segment. By pressing one of the number buttons on the numeric keypad of the remote control, the user can designate the target replay segment. The ID for the designated replay segment is transmitted to the reproducing position setting unit 112.

The reproducing position setting unit 112 has a function for detecting whether or not the replay segment of the CM exists between the current replay segment that is indicated by the reproducing position controlling unit 113 and the designated target replay segment by referring to the additional information stored in the additional information storing unit 115, when the ID is transmitted from the target designation accepting unit 111. When no replay segment of the CM is detected as a result of the detection, the reproducing position setting unit 112 sets the starting position of the target replay segment as the reproducing position, and instructs the reproducing position controlling unit 113 to change the reproducing position.

When at least one replay segment of the CM is detected as a result of the detection, the reproducing position setting unit 112 selects one of the replay segments of CMs and sets the starting position of the selected replay segment for the CM as the reproducing position, and instructs the reproducing position controlling unit 113 to change the reproducing position. When the reproducing of the data of the replay segment of the CM is completed, the reproducing position setting unit 112 sets the starting position of the target replay segment, and instructs the reproducing position controlling unit 113 to change the reproducing position.

[Data 4]

Next, an explanation about content and additional information according to the present embodiment is given.

Figure 12:
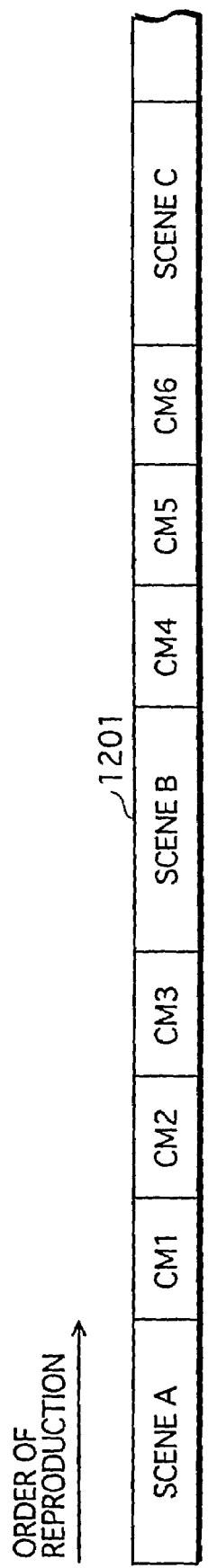
FIG. 12 schematically shows an example of content according to the present invention.

FIG. 12 schematically shows a content that includes the data of the CMs. The content reproducing apparatus reproduces the content in an order of a scene A, a CM1, a CM2, a CM3, a scene B, a CM4, a CM5, a CM6, and a scene C . . . , unless the instruction from the user, such as skipping and rewinding, is accepted.

FIG. 13 is a table showing additional information of a content 1201, and an additional information table 1301 shows an ID, a reproducing position information, and a CM attribute. The CM attribute is information to identify if a certain replay segment is data of the CM.

[Operation 4]

Next, an explanation about an operation of the content reproducing apparatus according to the present embodiment is given.

Figure 14:
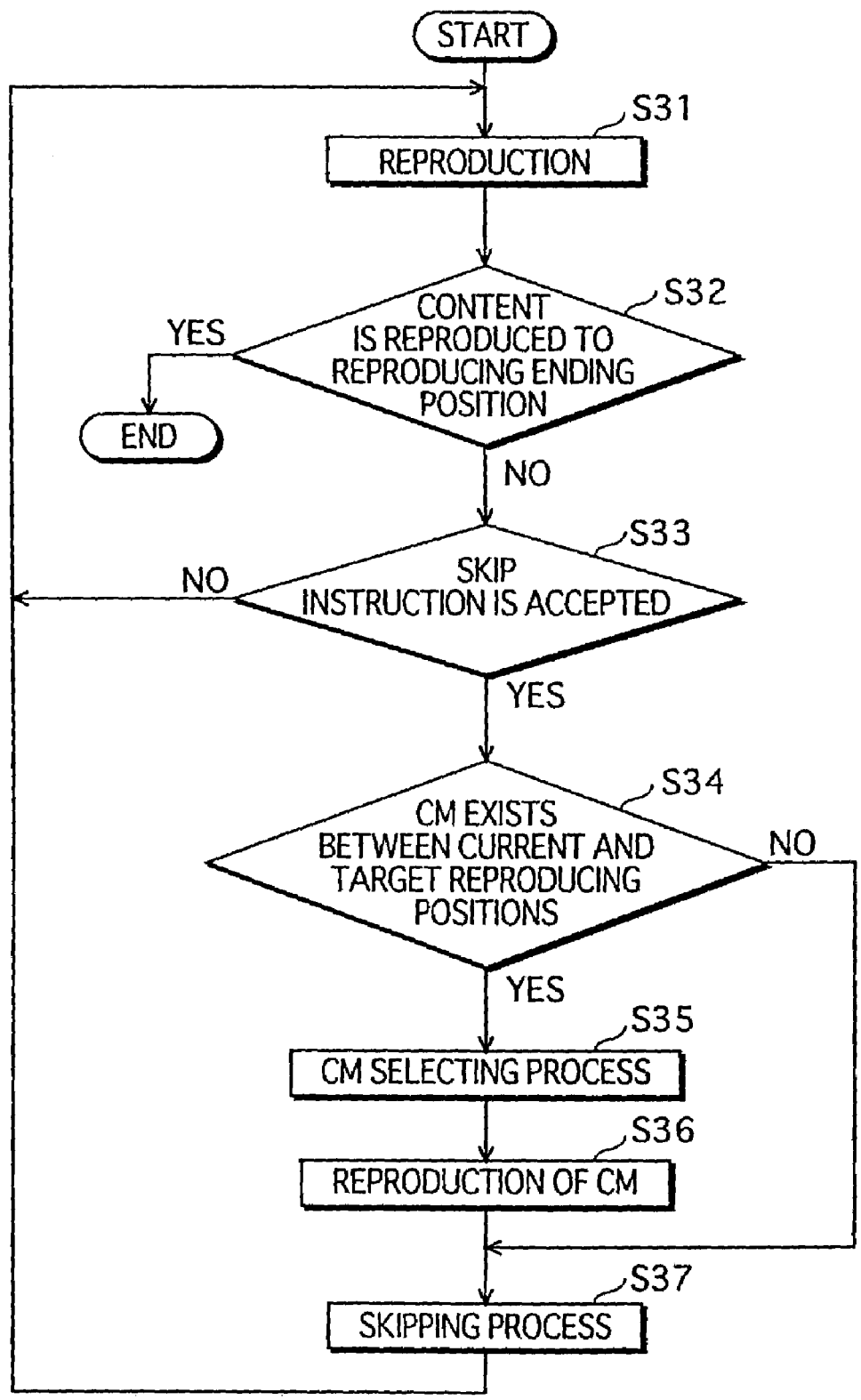
FIG. 14 is a flow chart showing content reproduction control of the content reproducing apparatus according to a fourth embodiment.

FIG. 14 is a flow chart showing content reproduction control of the content reproducing apparatus according to the present embodiment.

First, the data reproducing unit 114 reads the data of the reproducing position, which is controlled by there producing position controlling unit 113, from the data storing unit 116 and reproduces the data (S31).

The reproducing position setting unit 112 judges whether or not the reproducing position obtained from the reproducing position controlling unit 113 is the reproducing ending position of the content by referring to the additional information stored in the additional information storing unit 115 (S32). If the content is reproduced to the reproducing ending position (S32:YES), the reproduction ends. If the content is not reproduced to the reproducing ending position (S32:NO), the operation moves to S33.

Then, in S33, if the skip instruction accepting unit 111 accepts the skip instruction from the user (S33:YES), the reproducing position setting unit 112 detects whether or not the replay segment of the CM exists between the current replay segment that is indicated by the reproducing position controlling unit 113 and the designated target replay segment by referring to additional information stored in the additional information. When no replay segment of the CM is detected as a result of the detection (S34:NO), the operation moves to S37. When the replay segment of the CM is detected as a result of the detection (S34:YES), the operation moves to S35.

In S35, the reproducing position setting unit 112 executes a CM selecting process. If one replay segment of the CM is detected as a result of the detection, the reproducing position setting unit 112 sets the starting position of the replay segment of the CM as the reproducing position, and instructs the reproducing position controlling unit 113 to change the reproducing position (S36).

If more than one replay segment of the CM is detected, the reproducing position setting unit 112 selects one of the detected replay segments of the CMs. Examples of selection methods include following;

(1) selecting the replay segment of the CM that is to be reproduced first among a plurality of detected replay segments of the CMs;

(2) selecting the replay segment of the CM that is to be reproduced last among the plurality of detected replay segments of the CMs; and (3) selecting the replay segment of the CM randomly among the plurality of detected replay segments of the CMs.

Using one of three methods listed above, the reproducing position setting unit 112 selects the replay segment of the CM, sets the starting position of the selected replay segment of the CM as the reproducing position, and instructs the reproducing position controlling unit 113 to change the reproducing position (S36). Then, after the reproducing position of the selected replay segment of the CM reaches the reproducing ending position, the reproducing position setting unit 112 sets the starting position of the replay segment designated by the user as the reproducing position, and instructs the reproducing position controlling unit 113 to change the reproducing position (S37)

Fifth Embodiment

The content reproducing apparatuses according to the present invention have been explained in the first to fourth embodiments. In a fifth embodiment, explanations are given about a content transmitting/receiving system comprising a content transmitting apparatus for sequentially transmitting content that is divided into packets, and a content receiving/reproducing apparatus for sequentially receiving the content by the packet and reproducing the same.

Note that the content, the additional information, and the alternative data are the same as in the first embodiment.

In the content transmitting/receiving system according to the present embodiment, the content is transmitted and received via the Internet using a streaming technology. The content receiving/reproducing apparatus reproduces the content as sequentially receiving the content which is also sequentially transmitted from the content transmitting apparatus. Further, the content receiving/reproducing apparatus has a function for accepting instructions relating to reproduction of the content from the user while the content is being reproduced. The content receiving/reproducing apparatus transmits the instruction accepted to the content transmitting apparatus. The instructions relating to reproduction of the content include reproducing, stopping reproducing, skipping, and such.

The content transmitting apparatus stores the additional information of the content to be transmitted, and when the skip instruction is accepted from the content receiving/reproducing apparatus while transmitting the content, the content transmitting apparatus judges if the replay segment pointed out by the skip instruction is skippable by referring to the additional information. If the replay segment is unskippable as a result of the judgment and if the alternative data corresponds to the replay segment, the content transmitting apparatus transmits the alternative data and then the data of the replay segment successive to the replay segment pointed out by the skip instruction.

[Construction 5]

Figure 15:
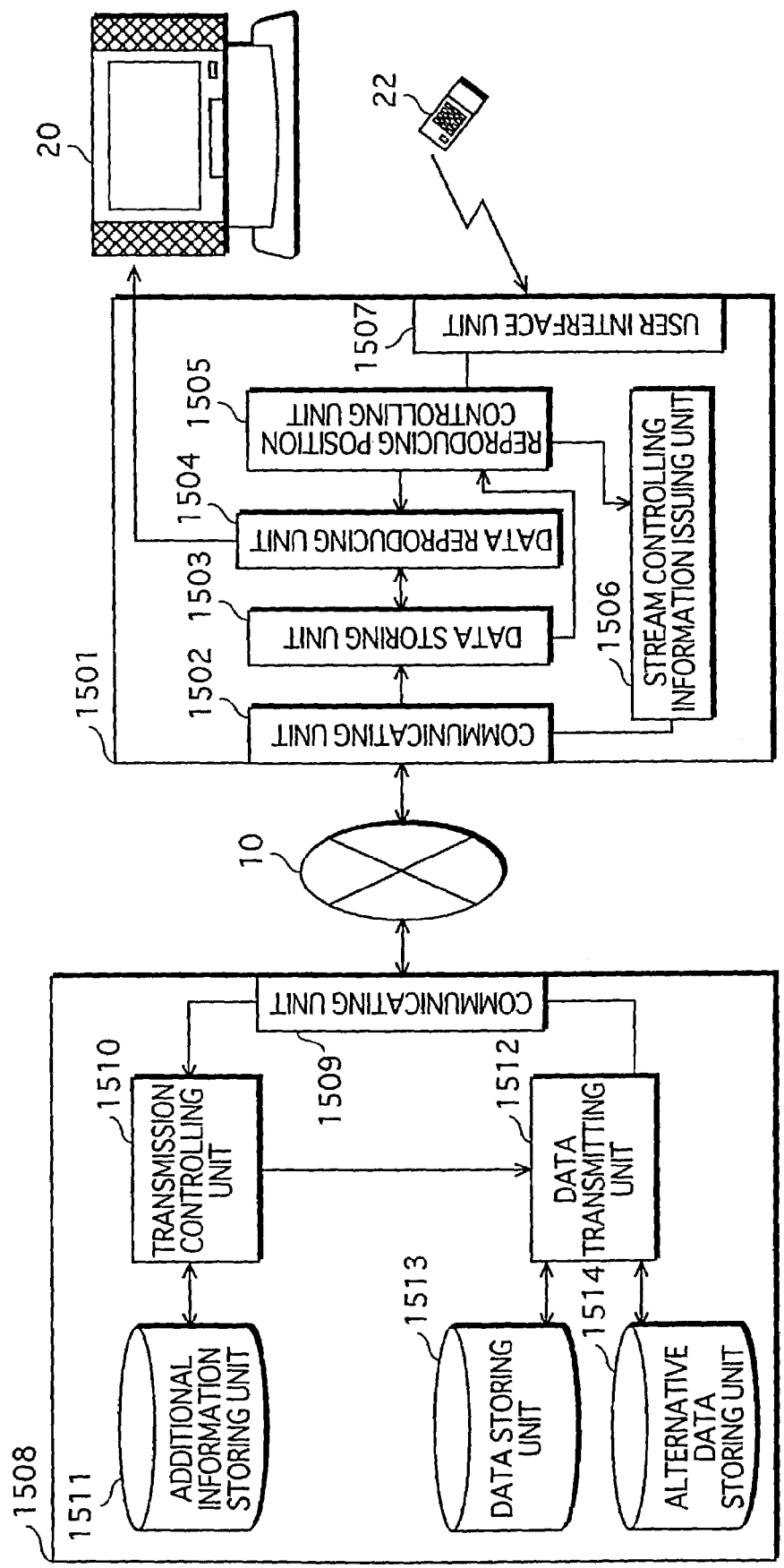
FIG. 15 is a structural functional diagram of a content transmitting/receiving system according to the present invention.

FIG. 15 is a structural functional diagram of a content receiving/reproducing apparatus 1501 and a content transmitting apparatus 1508 in a content transmitting/receiving system. The content receiving/reproducing apparatus 1501 and the content transmitting apparatus 1508 transmit and receive data via a network 10. The network 10 is the Internet.

As hardware, the content receiving/reproducing apparatus 1501 comprises a CPU, an input/output unit, a memory, a hard disk and the like. Functionally, the content receiving/reproducing apparatus 1501 comprises a communicating unit 1502, a data storing unit 1503, a data reproducing unit 1504, a reproducing position controlling unit 1505, a stream controlling information issuing unit 1506, and a user interface unit 1507. Each functional operation of the content receiving/reproducing apparatus 1501 is performed by the CPU executing a control program stored in the memory. Note that an explanation about functions that are not essential to the present invention is not given.

The user interface unit 1507 has a function for accepting instructions relating to reproduction of the content, such as reproducing, stopping reproducing, and skipping the content, from the user. Specifically, the instructions relating to reproduction of the content are accepted as electrical signals when the user presses a button designating each instruction that is provided to the main body of the content receiving/reproducing apparatus 1501 or a remote control thereof. The accepted instruction is transmitted to the reproducing position controlling unit 1505.

The communicating unit 1502 has a two-way communication function between the content transmitting apparatus 1508 via the network 10. For example, the communicating unit 1502 transmits content request information and stream control information such as reproducing, stopping reproducing, and skipping which is issued at the stream controlling information issuing unit 1506 to an IP address that is assigned to the content transmitting apparatus 1508. The communicating unit 1502 also receives data such as content transmitted from the content transmitting apparatus 1508. The data such as the stream control information and the content is transmitted based on RTSP/RTP (Real-Time Streaming Protocol/Real-Time Transport Protocol).

The data storing unit 1503 is a storage medium such as a memory and a hard disk, and temporarily stores partial data of the content that is sequentially received at the communicating unit 1502. The partial data of the content is packetized as an RTP packet, and content data and alternative data are stored in a payload of the RTP packet. Information showing content of the payload is described in a header of the RTP packet. For example, information such as a data ID, an alternative data ID, a content identifier, and time reference information for performing a real-time content reproduction process and synchronizing visual and sound are indicated.

The reproducing position controlling unit 1505 has a function for executing various operations relating to reproducing the content according to a control program stored in the memory, and instructs the data reproducing unit 1504 by referring to the header of the RTP packet when the RTP packet is stored in the data storing unit 1503. Further, when the user interface unit 1507 accepts the skip instruction from the user, the reproducing position controlling unit 1505 detects the data ID to identify the replay segment that is being reproduced when the skip instruction is accepted from the header of the RTP packet, and then transmits the data ID along with information to indicate the skip instruction to the stream controlling information issuing unit 1506.

The data reproducing unit 1504 has a function to read partial data stored in the data storing unit 1503 according to the instruction from the reproducing position controlling unit 1505, and reproduce the partial data. The reproduced partial data is output by a display apparatus 20 as an image or sound. The partial data reproduced by the data reproducing unit 1504 is discarded from the data storing unit 1503 upon the completion of the reproduction of the partial data.

The stream controlling information issuing unit 1506 has a function for issuing stream control information based on information indicating instructions, such as reproducing, skipping, or stopping reproducing content, transmitted from the reproducing position controlling unit 1505. Skip instruction information that designates skipping among stream control information includes the data ID transmitted from the reproducing position controlling unit 1505. The issued stream control information is transmitted to the communicating unit 1502.

Next, an explanation about the content transmitting apparatus 1508 is given. As hardware, the content transmitting apparatus 1508 comprises a CPU, an input/output unit, a memory, a high-capacity storage medium. Functionally, the content transmitting apparatus 1508 comprises a communicating unit 1509, a transmission controlling unit 1510, an additional information storing unit 1511, a data transmitting unit 1512, a data storing unit 1513, and an additional information storing unit 1514. Each functional operation of the content transmitting apparatus 1508 is performed by the CPU executing a control program stored in the memory. Note that an explanation about functions that are not essential to the present invention is not given.

The communicating unit 1509 has a two-way communication function between the content receiving/reproducing apparatus 1501 via the network 10. For example, the communicating unit 1509 receives the content request information and the stream control information, and sequentially transmits the RTP packet transmitted from the data transmitting unit 1512 to an IP address that is assigned to the content receiving/reproducing apparatus.

The additional information storing unit 1511 is a storage medium such as a hard disk, and stores the additional information of the content.

The data storing unit 1513 is a storage medium such as a hard disk, and stores the content.

The alternative data storing unit 1514 is a storage medium such as a hard disk, and stores the plurality of alternative data.

Note that the additional information, the content, and the alternative data are the same as in the first embodiment.

The transmission controlling unit 1510 has a function for performing various controls relating to transmitting the data, and instructs the data transmitting unit 1512 to read and transmit the data stored either in the data storing unit 1513 or the alternative data storing unit 1514. Further, when the skip instruction information is transmitted from the communicating unit 1509, the transmission controlling unit 1510 judges whether or not the replay segment designated by the data ID included in the skip instruction information is skippable, and then instructs the data transmitting unit to transmit the data based on a result of the judgment.

The data transmitting unit 1512 has functions for reading out the data to be transmitted according to the instruction from the transmission controlling unit 1510 from the data storing unit 1513 or the alternative data storing unit 1514, for packetizing the data that is read out as an RTP packet, and for sequentially transmitting to the communicating unit 1509. The data transmitting unit 1512 describes information showing content of the payload in the header of the RTP packet.

[Operation 5]

Next, an explanation about each operation of the content receiving/reproducing apparatus and a content transmitting apparatus that are included in a content transmitting/receiving system according to the present embodiment is given.

Figure 16:
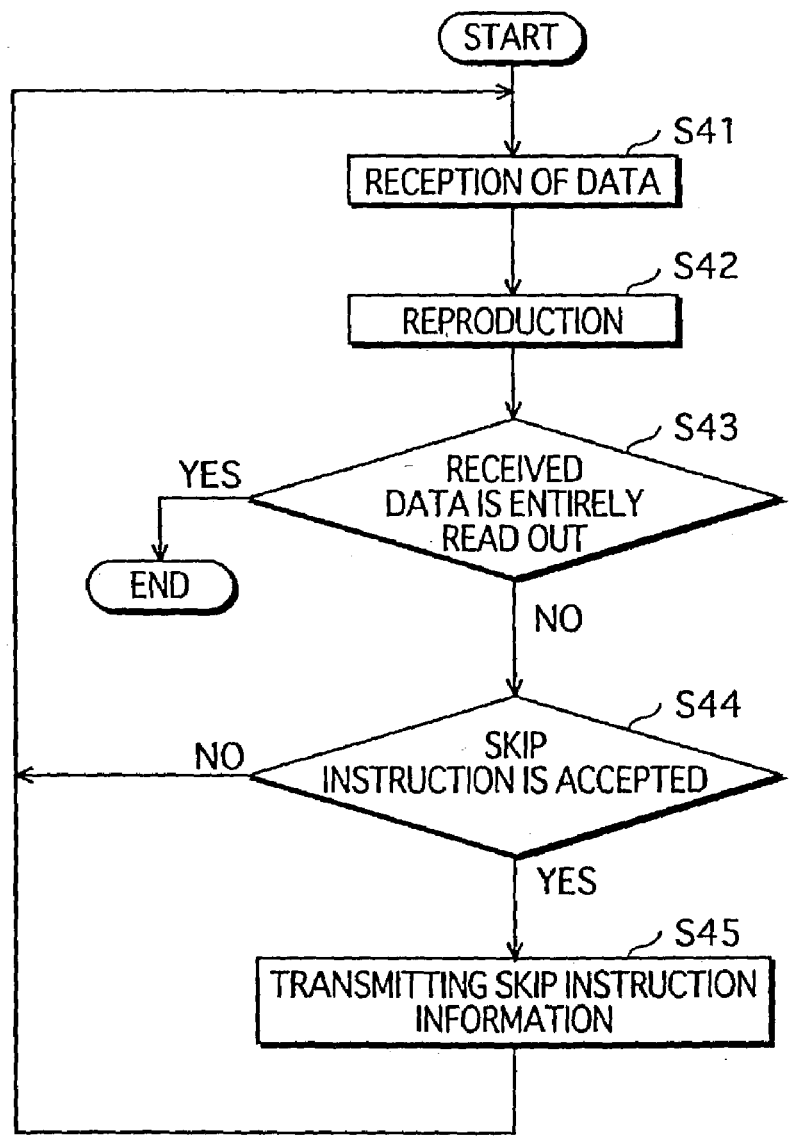
FIG. 16 is a flow chart showing content reception/reproduction control of a content receiving/reproducing apparatus according to the fourth embodiment.

FIG. 16 is a flow chart of content reception/reproduction control of the content receiving/reproducing apparatus according to present embodiment.

First, the communicating unit 1502 receives the RTP packet sequentially transmitted from the content transmitting unit 1508 and stores the RTP packet in the data storing unit 1503 (S41). The reproducing position controlling unit 1505 refers to the header of the RTP packet stored in the data storing unit 1503 and instructs the data reproducing unit to reproduce. The data reproducing unit, according to the instruction from the reproducing position controlling unit 1505, reads the data stored in a payload of the RTP packet from the data storing unit 1503 and reproduces the data (S42).

If transmitting the data from the content transmitting apparatus 1508 is completed and all of the data in the payload of the RTP packet stored in the data storing unit 1503 is read out (S43:YES), reproduction of the content ends. If the data is still being read out (S43:NO), the operation moves to S44.

In S44, if the user interface unit 1507 accepts the skip instruction from the user (S44:YES), the operation moves to S45. If the user interface unit 1507 does not receive the skip instruction from the user (S44:NO), the operation returns to S41.

In S45, the content receiving/reproducing apparatus 1501 transmits the skip instruction information that includes the data ID detected by the reproducing position controlling unit 1505 to the content transmission apparatus 1508 (S45).

Figure 17:
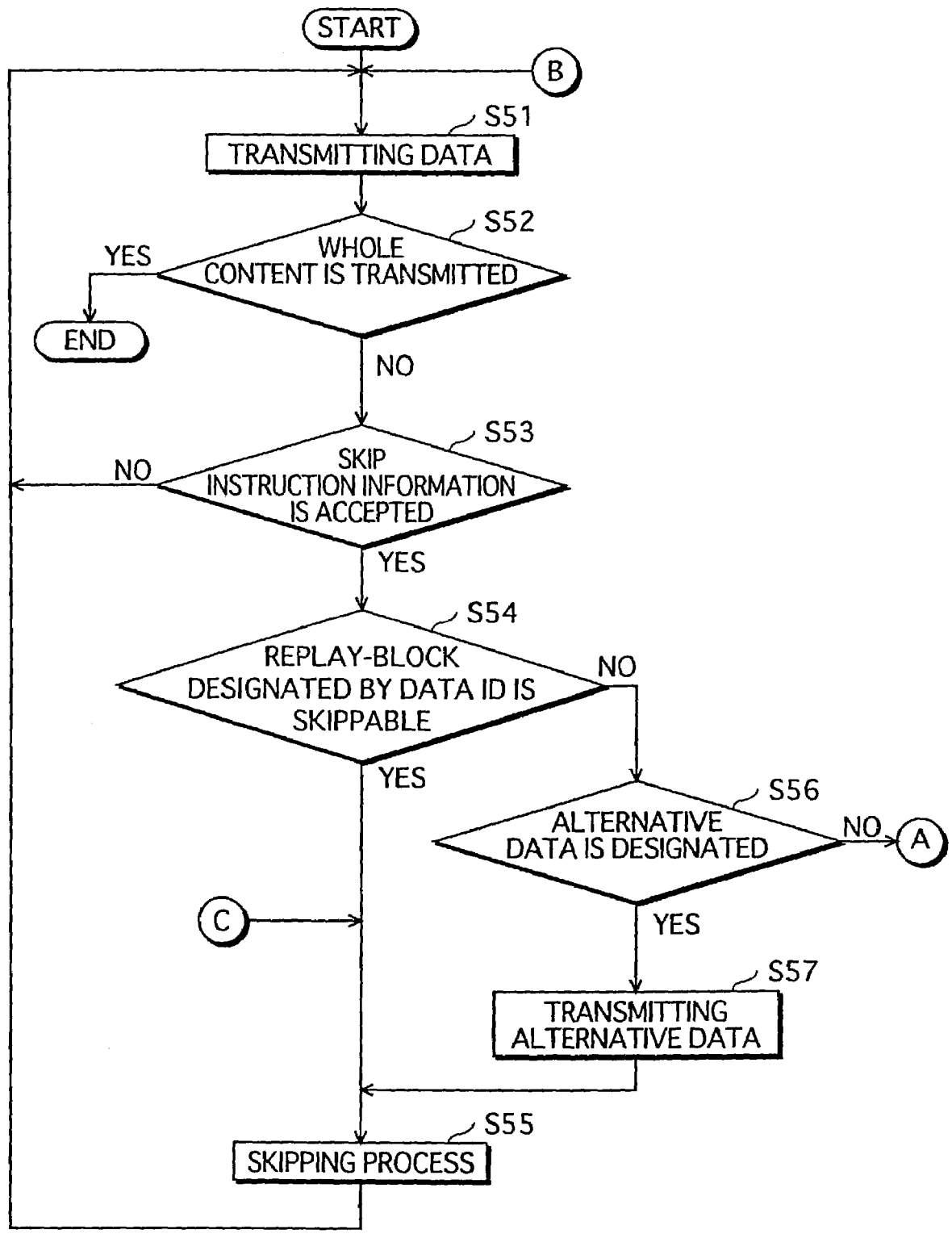
FIG. 17 is a flow chart showing content transmission control of a content transmitting apparatus according to the fourth embodiment.

FIGS. 17 and 5 are flow charts showing content transmission control of the content transmitting apparatus according to the present embodiment.

First, the data transmitting unit 1512 sequentially reads out the data from the data storing unit 1513 according to the instruction from the transmission controlling unit 1510, packetizes the read out data as the RTP packet, and transmits the data to the communicating unit 1509. The communicating unit 1509 sequentially transmits the RTP packet to an IP address assigned to the content receiving/reproducing apparatus (S51).

Then, the transmission controlling unit 1510 refers to the additional information stored in the additional information storing unit 1511. If the transmission controlling unit 1510 confirms that all the content is transmitted (S52:YES), the transmission controlling unit 1510 stops instructing the data transmitting unit 1512 to transmit the content. If the transmission controlling unit 1510 does not confirm that all the content are transmitted (S52:NO), the operation moves to S53.

In S53, if the communication 1509 receives the skip instruction information from the content receiving/reproducing apparatus 1501 (S53:YES), the transmission controlling unit 1510 refers to the additional information, and detects which replay segment the data ID included in the skip instruction information designates, and judges whether or not reproducing the data of the designated replay segment is skippable. If the communication 1509 does not receive the skip instruction information (S53:NO), the operation returns to S51.

If the replay segment pointed out by the skip instruction is turned out to be the replay segment is skippable as a result of the judgment (S54:YES), the operation moves to S55. If the result of the judgment shows that the replay segment is unskippable (S54:NO), the operation moves to S56.

In S55, the transmission controlling unit 1510 executes a skipping process. Specifically, the transmission controlling unit 1510 sets the beginning of the successive replay segment to the replay segment pointed out by the skip instruction as the transmission starting position, and instructs the data transmitting unit 1512 to change the data to be read out. Then, the operation returns to S51.

In S56, the transmission controlling unit 1510 refers to the additional information, and confirms if the alternative data is assigned to the replay segment designated by the data ID included in the skip instruction information. If the alternative data is not assigned (S56:NO), the operation moves to S08. If the alternative data is assigned (S56:YES), the operation moves to S57.

In S57, the transmission controlling unit 1510 has the data transmitting unit 1512 read out the alternative data from the alternative data storing unit 1514, and transmit the alternative data. When transmitting the alternative data is completed, the operation moves to S55, and the transmission controlling unit 1510 executes the skipping process.

In S08, the transmission controlling unit 1510 counts the accept number of the skip instructions. Then in S09, the transmission controlling unit 1510 compares the number of acceptance of the skip instructions and the maximum threshold value indicated in the additional information. If the accept number of the skip instructions is larger than the maximum threshold value (S09:YES), the transmission controlling unit 1510 judges to make the skip instruction ineffective (S10). If the accept number of the skip instructions is smaller than the maximum threshold value (S09: NO), the operation returns to S51.

Note that while the alternative data is being reproduced, the content receiving/reproducing apparatus in the content transmitting/receiving system according to the present embodiment makes the skip instruction ineffective and makes the ineffective skip instruction effective again when the reproducing of the alternative data is completed.

Sixth Embodiment

In the content transmitting/receiving system according to the fifth embodiment, the skip instruction from the user is made ineffective while the alternative data is being reproduced. In the content transmitting/receiving system according to the present embodiment, when the content receiving/reproducing apparatus accepts the skip instruction from the user while an alternative data 1 is being reproduced, the content receiving/reproducing apparatus transmits skip instruction information to the content transmitting apparatus. The content transmitting apparatus refers to the alternative data additional information stored in the additional information storing unit, and transmits an alternative data 2 in place of the alternative data 1.

The content transmitting/receiving system has substantially the same functional structure as in FIG. 15. However, the additional information storing unit 1511 in FIG. 15 stores the alternative data additional information. The alternative data additional information is the same as in the third embodiment.

[Operation 6]

Next, an explanation about an operation of the content transmitting apparatus according to the present embodiment is given. The operation of the content receiving/reproducing apparatus is the same as what has been explained in the fifth embodiment, and not explained below.

Figure 18:
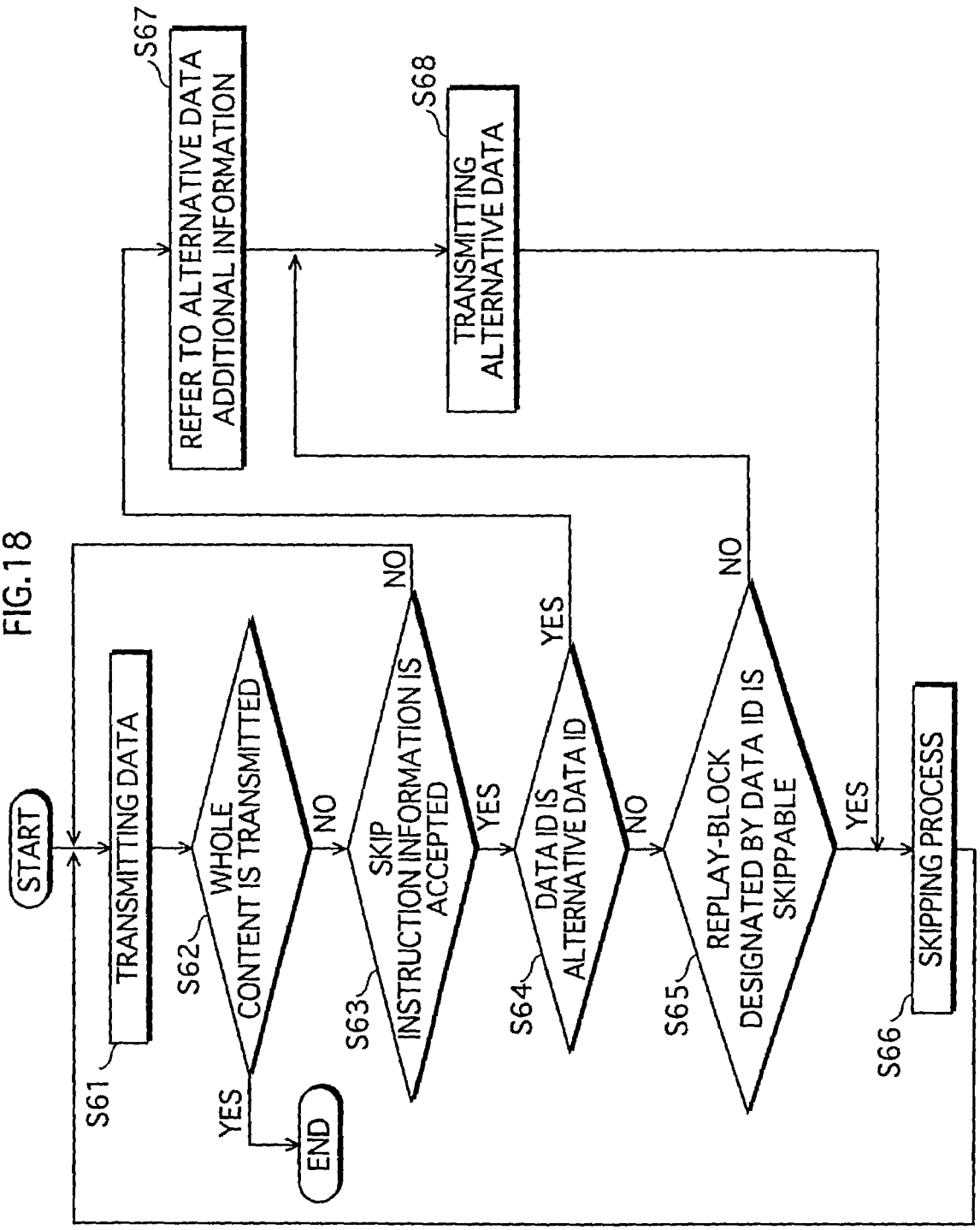
FIG. 18 is a flow chart showing content transmission control of a content transmitting apparatus according to a sixth embodiment.

FIG. 18 is a flow chart showing content transmission control of the content transmitting apparatus according to the present embodiment.

Steps from S61 through S63 are the same as the steps from S51 through S53 illustrated in the flow chart in FIG. 17, and therefore, the explanation is not given here.

In S64, the skip instruction information that the communicating unit 1509 in FIG. 15 receives from the content receiving/reproducing apparatus 1501 is transmitted to the transmission controlling unit 1510. The transmission controlling unit 1510 refers to the additional information stored in the additional information storing unit 1511, and judges whether or not the data ID included in the skip instruction information is the alternative data ID. If the data ID is the alternative data ID (S64:YES), the operation moves to S67. If the data ID is not the alternative ID (S64:NO), the operation moves to S66.

In S67, the transmission controlling unit 1510 refers to the alternative data additional information stored in the additional information storing unit 1511, and determines the alternative data to be reproduced in place of the alternative data that is being reproduced (S67). Then, the operation returns to S61.

Modified Examples

The present invention is not restricted to the above explained embodiments, and modified examples explained below are also possible.

(1) In each embodiment, explanations are given assuming that the content is provided via the network by the content distributing system. However, it is also possible to apply the present invention to the content that is recorded in a storage medium such as CDs and DVDs.

(2) In the first embodiment, the explanation is given to a case in which the alternative data has a primary correspondence to a certain replay segment such as the CM. However, the alternative data does not need to have the primary correspondence. For example, it is possible that the alternative data is selected from the plurality of alternative data stored in the alternative data storing unit 108 based on a certain priority. Specifically, when the alternative data is the CM, the priority changes according to sales data of a product that the CM advertises. An example for setting of a priority order can be such that if sales of this month is less than the last month, the priority increases, and if the sales of this month is more than the last month, the priority decreases.

(3) The first embodiment explained that the content reproducing apparatus reproduces the alternative data in place of the data of the unskippable replay segment, and the content reproducing apparatus starts reproducing the data of the succeeding replay segment when the reproducing of the alternative data is completed. In this case, however, a total period of time for reproducing could become long. For example, the user instructs skipping while the data of the unskippable replay segment, and if a length of time for reproducing the alternative data is as long as the length of time for reproducing the skipped replay segment, the total reproducing time becomes longer by the period of time that the skipped replay segment is already reproduced. In the content reproducing apparatus according to the present invention, it is possible to make the speed of reproducing the alternative data faster than the normal reproducing speed, and reproducing the alternative data can be completed within the period of time of a part of the skipped replay segment that is not yet reproduced.

(4) The content reproducing apparatus according to the third embodiment and the content transmitting/receiving system according to the fifth embodiment execute a control to reproduce another alternative data when a skip instruction to skip the alternative data is accepted. To select another alternative data, a method based on freshness of alternative data can be employed. As information to indicate the freshness, data information such as information about the date when the alternative data is generated and the date when the alternative data is stored in the content reproducing apparatus or the content transmitting apparatus in the content transmitting/receiving system.

Further, it is also possible to select the alternative data related to the main content. For example, if an actor A appears in the main content, the CM in which the actor A advertises the product is selected by priority. If the main content is a cookery program, the CM about foodstuff is selected by priority as the alternative data.

(5) In the explanation about the content reproducing apparatus according to the fourth embodiment, three methods for selecting the replay segment of the CM to be reproduced, when more than one replay segment of the CM is detected between the replay segment that is being reproduced when information designating the target replay segment is accepted and the target replay segment that is designated by the user, are listed. However, the method for selecting the replay segment is not restricted to the above three methods, and it is also possible to grade the replay segments of the CMs and select the replay segment that is higher in rank. Further, the number of replay segments to be selected can be more than one.

(6) The content transmitting/receiving system according to the fifth embodiment transmits and receives the data based on RTSP/RTP. However, the protocol is not restricted to RTSP/RTP, and any protocol that is appropriate to streaming transmission can be used.

(7) The content transmitting/receiving system according to the fifth embodiment uses the data ID, which is described in the header of the RTP packet, as information identifying the replay segment to be skipped. However, the present invention is not restricted to this embodiment, and it is also possible to identify the replay segment using time information related to reproducing that is indicated in the header of the RTP packet, for example.

(8) In the content transmitting/receiving system according to the present invention, it is also possible that the content transmitting apparatus adds information about ineffectiveness of skip instruction from a user in the header of the RTP packet that conveys data of the replay segment when the data of the replay segment that is unskippable, and that the content receiving/reproducing apparatus, which receives and reproduce the RTP packet that is added the information about ineffectiveness of skip instruction, does not issue the skip instruction information to the content transmitting apparatus when the skip instruction is accepted from the user, if the information about ineffectiveness of skip instruction is added to the header of the RTP packet.

(9) The content transmitting/receiving system according to the present invention also can be a content transmitting/receiving system that transmits all or a part of the alternative data corresponding to the replay segment at the same time when the content transmitting apparatus transmits the data of the unskippable replay segment. In the content transmitting/receiving system explained in the fifth embodiment, a problem could occur that the reproduction is temporarily suspended due to time-lag in the network, because the alternative data is transmitted to the content receiving/reproducing apparatus after the skip instruction from the user is accepted.

However, by transmitting all or the part of an alternative data at the same time when the data of the unskippable replay segment, the content receiving/reproducing apparatus can buffer all or the part of the alternative data, and reproduce the buffered alternative data seamlessly when the skip instruction from the user is accepted.

Further, preparing for a case in which the skip instruction is newly accepted while the alternative data is being reproduced, the content receiving/reproducing apparatus according to the present invention can also be such that a content receiving/reproducing apparatus requests the content transmission apparatus requesting for another alternative data which is different from the alternative data buffered in advance when accepting the skip instruction at the unskippable replay segment.

(10) The operations of the content reproducing apparatus and the content transmitting/receiving system explained in each embodiment (such as the operations explained in FIGS. 4, 5, 10, 14, 16, and 18) can also be an invention about methods for content reproduction and content transmission. Further, the methods for content reproduction and content transmission can also be computer programs realized by a computer, and can also be digital signals made from the computer programs.

(11) The present invention can be an invention of the computer programs or the digital signals that are recorded in a computer readable storage medium such as a flexible disk, a hard disk, CD-ROM, MO, DVD, DVD-ROM, DVD-RAM, BD (Blue-ray Disc), and a semiconductor memory.

(12) The present invention can also be an invention of the computer programs or the digital signals that are transmitted via a telecommunication line, a wireless connection, a cable communication line, and the network represented by the Internet, and the like.

Although the present invention has been fully described by way of examples by referring to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A content reproducing apparatus comprising:
   a reproducing unit operable to reproduce a content, the content being stream data divided into a plurality of replay segments;
   an obtaining unit operable to obtain an alternative data and additional information indicating, for each of the replay segments, whether reproduction of data of the replay segment is skippable;
   an accepting unit operable to accept a skip instruction that instructs skipping reproduction of a first replay segment that is currently being reproduced, from a user while the content is being reproduced;
   a judging unit operable to judge whether or not reproduction of the data of the first replay segment is skippable by referring to the additional information; and
   a controlling unit operable to:
   (A) when the judgment result of the judging unit is affirmative, control so that the reproduction of the data of the first replay segment is skipped; and
   (B) when the judgment result of the judging unit is negative, control so that the alternative data is reproduced in place of an unreproduced part of the data of the first replay segment, and data of a second replay segment is reproduced when the reproducing of the alternative data is completed, the first replay segment being one of the plurality of replay segments in the content, and the second replay segment being located after the first replay segment on a reproducing timeline of the content.

2. A content reproducing apparatus according to claim 1, wherein
   the obtaining unit obtains a plurality of alternative data, and
   when the judgment result of the judging unit is negative, the controlling unit controls so that an entire part of at least one of the plurality of alternative data is reproduced in place of the unreproduced part of the data of the first replay segment, and the data of the second replay segment is reproduced when the reproducing of the alternative data is completed.

3. A content reproducing apparatus according to claim 1, wherein
   when the judgment result of the judging unit is negative, the controlling unit controls so that the alternative data is reproduced in place of the unreproduced part of the data of the first replay segment, for a period of time of the unreproduced part of the data of the first replay segment, and then the data of the second replay segment is reproduced.

4. A content reproducing apparatus according to claim 1, wherein
when the judgment result of the judging unit is negative, the controlling unit controls so that the alternative data is reproduced in place of the unreproduced part of the data of the first replay segment, and if a new skip instruction from the user is accepted by the accepting unit while the alternative data is being reproduced, the new skip instruction is made ineffective.

5. A content reproducing apparatus according to claim 1, wherein
the obtaining unit obtains a plurality of alternative data, and
when the judgment result of the judging unit is negative, the controlling unit controls so that a first alternative data is reproduced in place of the unreproduced part of the data of the first replay segment, and a second alternative data is reproduced if a new skip instruction from the user is accepted by the accepting unit while the first alternative data is being reproduced, and the data of the second replay segment is reproduced when the reproducing of one of the plurality of alternative data is completed, the first alternative data being one of the plurality of alternative data, the second alternative data being one of the plurality of alternative data different from the first alternative data.

6. A content reproducing apparatus according to claim 1, wherein
the obtaining unit obtains alternating order information and a plurality of alternative data, the alternating order information indicating an order in which the plurality alternative data are selected, and
when the judgment result of the judging unit is negative, the controlling unit controls so that a selected alternative data selected based on the alternating order information is reproduced in place of the unreproduced part of the data of the first replay segment, and the data of the second replay segment is reproduced when the reproducing of the selected alternative data is completed.

7. A content reproducing apparatus according to claim 1, wherein
when the judgment result of the judging unit is negative, the controlling unit controls so that a primary alternative data set for the first replay segment in advance is reproduced in place of the unreproduced part of the data of the first replay segment, and the data of the second replay segment is reproduced when the reproducing of the alternative data is completed.

8. A content reproducing apparatus according to claim 1 further comprising:
a designation accepting unit operable to accept a designation of the alternative data from the user, wherein
the obtaining unit obtains a plurality of alternative data, and
when the judgment result of the judging unit is negative, the controlling unit controls so that a designated alternative data that is designated by the user is reproduced in place of the unreproduced part of the data of the first replay segment, and the data of the second replay segment is reproduced when the reproducing of the designated alternative data is completed.

9. A content reproducing apparatus according to claim 1, wherein
the additional information further indicates correspondence between each replay segment that is unskippable and the alternative data, and
the control unit controls so that, when the judgment result in the judging unit is negative, the alternative data which corresponds to the first replay segment in the additional information is reproduced in place of the unreproduced part of the data of the first replay segment, and the data of the second replay segment is reproduced when the reproducing of the alternative data is completed.

10. A content reproducing apparatus according to claim 9, further comprising:
a determining unit operable to determine, only when the judgement result in the judging unit is negative and the alternative data does not correspond to the first replay segment in additional information, whether or not to make the skip instruction ineffective depending on if at least a part of data of a third replay segment is skipped, the third replay segment being located before the first replay segment on a reproducing time-line of the content.

11. A content reproducing apparatus according to claim 10, wherein
the additional information further indicates an attribute of each replay segment, and
the determining unit determines, only when the judgement result in the judging unit is negative and the alternative data does not correspond to the first replay segment in additional information, whether or not to make the skip instruction ineffective depending on if at least a part of data of a fourth replay segment is skipped, the fourth replay segment having a same attribute as the first replay segment being located before the first replay segment on a reproducing time-line of the content.

12. A content reproducing apparatus according to claim 10 further comprising:
an accept number storing unit operable to count and store an accept number, the accept number indicating how many times the skip instruction from the user is accepted, wherein
the determining unit determines to make the skip instruction ineffective if the accept number is larger than a predetermined threshold value.

13. A content reproducing apparatus according to claim 12 further comprising:
a user information obtaining unit operable to obtain user information which is information about the user; and
a user threshold value setting unit operable to set the threshold value based on the obtained user information, wherein
the determining unit determines to make the skip instruction accepted from the user by the accepting unit ineffective, if the accept number is larger than the threshold value set by the user threshold value setting unit.

14. A content reproducing apparatus according to claim 12 further comprising:
a time corresponding threshold value setting unit operable to set the threshold value corresponding to a length of time that is required to reproduce an entire part of the content, wherein
the determining unit determines to make the skip instruction accepted from the user by the accepting unit ineffective, if the accept number is larger than the threshold value set by the time corresponding threshold value setting unit.

15. A content reproducing apparatus according to claim 1, wherein
the additional information further indicates correspondence between each replay segment that is unskippable and a plurality of alternative data, and
the controlling unit controls so that, when the judgment result in the judging unit is negative, a first alternative data that corresponds to the first replay segment in the additional information is reproduced in place of the unreproduced part of the data of the first replay segment, and if a new skip instruction from the user is accepted by the accepting unit while the first alternative data is being reproduced, a second alternative data that corresponds to the first replay segment is reproduced, and the data of the second replay segment is reproduced when the reproducing of any of the plurality of alternative data that corresponds to the first replay segment is completed, the first alternative data being one of the plurality of alternative data, the second alternative data being one of the plurality of alternative data and different from the first alternative data.

16. A content reproducing apparatus according to claim 1, wherein
the additional information further indicates an order in which a plurality of alternative data are selected, and
the controlling unit controls so that, when the judgement result in the judging unit is negative, a selected alternative data selected based on the order indicated in the additional information is reproduced in place of the unreproduced part of the data of the first replay segment, and the data of the second replay segment is reproduced when the reproducing of the selected alternative data is completed.

17. A content reproducing apparatus according to claim 1, further comprising:
an attribute information obtaining unit operable to obtain attribute information indicating an attribute of each of the plurality of replay segments;
a designation accepting unit operable to accept a designation of one of the plurality of replay segments as a skip target; and
a detecting unit operable to detect, when the designation accepting unit accepts the designation of a second replay segment as the skip target from a user while data of a first replay segment is being reproduced, whether or not a replay segment having a certain attribute exists between the first replay segment and the second replay segment by referring to the attribute information, the first replay segment being one of replay segments in the content, the second replay segment being located after the first replay segment on a reproducing time-line of the content, wherein
the controlling unit controls so that, only when the detecting unit detects at least one replay segment having the certain attribute between the first replay segment and the second replay segment, the replay segment having the certain attribute is selected and reproduced in place of the unreproduced part of the data of the first replay segment, and then data of the second replay segment is reproduced.

18. A content reproducing apparatus according to claim 17, wherein
the controlling unit controls so that, when a plurality of replay segments having the certain attribute exist between the first replay segment and the second replay segment, the replay segment having the certain attribute and to be reproduced first according to an order of reproduction is selected from the plurality of replay segments and reproduced in place of the unreproduced part of the data of the first replay segment, and then the data of the second replay segment is reproduced.

19. A content reproducing apparatus according to claim 17, wherein
the controlling unit controls so that, when a plurality of replay segments having the certain attribute exist between the first replay segment and the second replay segment, the replay segment having the certain attribute and to be reproduced last according to an order of reproduction is selected from the plurality of replay segments and reproduced in place of the unreproduced part of the data of the first replay segment, and then the data of the second replay segment is reproduced.

20. A content reproducing apparatus according to claim 17, wherein
the controlling unit controls so that, when a plurality of replay segments having the certain attribute exist between the first replay segment and the second replay segment, the replay segment having the certain attribute is selected randomly from the plurality of replay segments and reproduced in place of the unreproduced part of the data of the first replay segment, and then the data of the second replay segment is reproduced.

21. A method for reproducing content comprising:
reproducing a content, the content being stream data divided into a plurality of replay segments;
obtaining an alternative data and additional information indicating, for each of the replay segments, whether reproduction of data of the replay segment is skippable;
accepting a skip instruction that instructs skipping reproduction of a first replay segment that is currently being reproduced, from a user while the content is being reproduced;
judging whether or not reproduction of the data of the first replay segment is skippable by referring to the additional information; and
controlling so that:
(A) when the judgment result of the judging is affirmative, the reproduction of the data of the first replay segment is skipped; and
(B) when the judgment result of the judging is negative, the alternative data is reproduced in place of an unreproduced part of the data of the first replay segment, and data of a second replay segment is reproduced when the reproducing of the alternative data is completed, the first replay segment being one of the plurality of replay segments in the content, and the second replay segment being located after the first replay segment on a reproducing time-line of the content.

22. A method for reproducing content according to claim 21, further comprising:
obtaining attribute information indicating an attribute of each of the plurality of replay segments;
accepting a designation of one of the plurality of replay segments as a skip target; and
detecting, when the accepting accepts the designation of a second replay segment as the skip target from a user while data of a first replay segment is being reproduced, whether or not a replay segment having a certain attribute exists between the first replay segment and the second replay segment by referring to the attribute information, the first replay segment being one of replay segments in the content, the second replay segment being located after the first replay segment on a reproducing time-line of the content, wherein the controlling controls so that, only when the detecting detects at least one replay segment having the certain attribute between the first replay segment and the second replay segment, the replay segment having the certain attribute is selected and reproduced in place of the unreproduced part of the data of the first replay segment, and then data of the second replay segment is reproduced.

23. Storage medium in which a CPU program for controlling content reproduction used in a content reproducing apparatus having a CPU is recorded, the CPU program having CPU-readable instructions capable of instructing the CPU to perform the method comprising:
reproducing a content, the content being stream data divided into a plurality of replay segments;
obtaining an alternative data and additional information indicating, for each of the replay segments, whether reproduction of data of the replay segment is skippable;
accepting a skip instruction that instructs skipping reproduction of a first replay segment that is currently being reproduced, from a user while the content is being reproduced; and
judging whether or not reproduction of the data of the first replay segment is skippable by referring to the additional information; and
controlling so that:
  (A) when the judgment result of the judging is affirmative, the reproduction of the data of the first replay segment is skipped; and
  (B) when the judgment result of the judging is negative, the alternative data is reproduced in place of an unreproduced part of the data of the first replay segment, and data of a second replay segment is reproduced when the reproducing of the alternative data is completed, the first replay segment being one of the plurality of replay segments in the content, and the second replay segment being located after the first replay segment on a reproducing time-line of the content.

24. Storage medium according to claim 23, in which a CPU program for controlling content reproduction used in a content reproducing apparatus having a CPU is recorded, the CPU program having CPU-readable instructions capable of instructing the CPU to perform the method further comprising:
obtaining attribute information indicating an attribute of each of the plurality of replay segments;
accepting a designation of one of the plurality of replay segments as a skip target; and
detecting, when the accepting accepts the designation of a second replay segment as the skip target from a user while data of a first replay segment is being reproduced, whether or not a replay segment having a certain attribute exists between the first replay segment and the second replay segment by referring to the attribute information, the first replay segment being one of replay segments in the content, the second replay segment being located after the first replay segment on a reproducing time-line of the content, wherein
the controlling controls so that, only when the detecting detects at least one replay segment having the certain attribute between the first replay segment and the second replay segment, the replay segment having the certain attribute is selected and reproduced in place of the unreproduced part of the data of the first replay segment, and then data of the second replay segment is reproduced.

25. A content reproducing apparatus comprising:
a reproducing unit operable to reproduce a content, the content being stream data divided into a plurality of replay segments;
an obtaining unit operable to obtain an alternative data;
an accepting unit operable to accept an instruction from a user while the content is being reproduced;
a controlling unit operable to control so that, if the instruction is a skip instruction that instructs skipping reproduction of data of a first replay segment, the alternative data is reproduced in place of the data of the first replay segment with or without a condition, and data of a second replay segment is reproduced when the reproducing of the alternative data is completed, the first replay segment being one of the plurality of replay segments in the content, the second replay segment being located after the first replay segment on a reproducing time-line of the content; and
a judging unit operable to judge whether or not reproduction of the data of the first replay segment is skippable by referring to additional information, if the instruction from the user accepted by the accepting unit is the skip instruction, the additional information indicating if reproduction of data of each of the plurality of replay segments in the content is skippable,
wherein the obtaining unit obtains the additional information,
wherein the controlling unit controls so that, only when a judgment result in the judging unit is negative, the alternative data is reproduced in place of the data of the first replay segment, and the data of the second replay segment is reproduced when the reproducing of the alternative data is completed,
wherein the additional information further indicates correspondence between each replay segment that is unskippable and the alternative data,
wherein the control unit controls so that, only when the judgment result in the judging unit is negative, the alternative data which corresponds to the first replay segment based on the additional information is reproduced in place of data of the first replay segment, and the data of the second replay segment is reproduced when the reproducing of the alternative data is completed, and
wherein a determining unit is operable to determine, only when the judgement result in the judging unit is negative and the alternative data does not correspond to the first replay segment in additional information, whether or not to make the skip instruction ineffective depending on if at least a part of data of a third replay segment is skipped, the third replay segment being located before the first replay segment on a reproducing time-line of the content.

26. A content reproducing apparatus according to claim 25, wherein
the additional information further indicates an attribute of each replay segment, and
the determining unit determines, only when the judgement result in the judging unit is negative and the alternative data does not correspond to the first replay segment in additional information, whether or not to make the skip instruction ineffective depending on if at least a part of data of a fourth replay segment is skipped, the fourth replay segment having a same attribute as the first replay segment being located before the first replay segment on a reproducing time-line of the content.

* * * * *